United States Patent
Chakrabarti et al.

(10) Patent No.: US 6,760,724 B1
(45) Date of Patent: Jul. 6, 2004

(54) APPROXIMATE QUERY PROCESSING USING WAVELETS

(75) Inventors: Kaushik Chakrabarti, Irvine, CA (US); Minos N. Garofalakis, Chatham Township, NJ (US); Rajeev Rastogi, New Providence, NJ (US); Kyuseok Shim, Bedminster, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 199 days.

(21) Appl. No.: 09/624,115

(22) Filed: Jul. 24, 2000

(51) Int. Cl.[7] .............................................. G06F 17/30
(52) U.S. Cl. .............................. 707/4; 707/1; 707/102; 704/9
(58) Field of Search .............................. 707/1, 4, 102, 707/104.1; 382/283, 232, 149, 100, 248, 224, 279, 128, 132; 704/9; 375/240.03, 240.11; 700/17; 386/46

(56) References Cited

U.S. PATENT DOCUMENTS

| | | | | |
|---|---|---|---|---|
| 5,647,058 A | * | 7/1997 | Agrawal et al. ............... 707/1 |
| 5,668,897 A | * | 9/1997 | Stolfo ......................... 382/283 |
| 5,734,893 A | * | 3/1998 | Li et al. ......................... 707/4 |
| 5,748,780 A | * | 5/1998 | Stolfo ......................... 382/232 |
| 5,777,678 A | * | 7/1998 | Ogata et al. ........... 375/240.11 |
| 5,790,694 A | * | 8/1998 | Maruo ......................... 382/149 |
| 5,875,108 A | * | 2/1999 | Hoffberg et al. .............. 700/17 |
| 5,878,426 A | * | 3/1999 | Plasek et al. ............... 707/102 |
| 6,070,133 A | * | 5/2000 | Brewster et al. ............... 704/9 |
| 6,185,254 B1 | * | 2/2001 | Ogata .................... 375/240.03 |
| 6,195,465 B1 | * | 2/2001 | Zandi et al. ................ 382/248 |
| 6,226,636 B1 | * | 5/2001 | Abdel-Mottaleb et al. ..... 707/4 |
| 6,289,165 B1 | * | 9/2001 | Abecassis ..................... 386/46 |
| 6,411,724 B1 | * | 6/2002 | Vaithilingam et al. ....... 382/100 |
| 6,421,463 B1 | * | 7/2002 | Poggio et al. ............. 382/224 |
| 6,507,840 B1 | * | 1/2003 | Ioannidis et al. .............. 707/4 |
| 6,510,406 B1 | * | 1/2003 | Marchisio ...................... 704/9 |

* cited by examiner

*Primary Examiner*—Charles Rones
*Assistant Examiner*—Hassan Mahmoudi

(57) ABSTRACT

A method for querying electronic data. The query method comprises creating wavelet-coefficient synopses of the electronic data and then querying the synopses in the wavelet-coefficient domain to obtain a wavelet-coefficient query result. The wavelet-coefficient query result is then rendered to provide an approximate result.

18 Claims, 9 Drawing Sheets

| TECHNIQUE | NUMBER OF COEFFICIENTS | | | |
|---|---|---|---|---|
| | 500 | 1000 | 2000 | 5000 |
| WAVELETS | 0.01 | 0.02 | 0.04 | 0.08 |
| HISTOGRAMS | 9.8 | 1.48 | 0.43 | 1.26 |

US 6,760,724 B1

APPROXIMATE QUERY PROCESSING USING WAVELETS

FIELD OF THE INVENTION

The present invention relates generally to querying electronic documents and, more particularly, to approximate query processing of electronic documents.

BACKGROUND OF THE INVENTION

Presently, there are vast amounts of electronically stored data, with additional electronic data available daily. As the amount of electronically stored data swells, it will become increasingly difficult to search the electronic data for desired information. Accordingly, faster querying methods for examining electronic data are desirable.

Approximate query processing has recently emerged as a viable solution for dealing with large amounts of electronic data, high query complexities, and stringent response time requirements. Typically, users pose complex queries to a Database Management System (DBMS) which require complex operations to be performed over Gigabytes or Terabytes of disk-resident data and, thus, take a long time to execute to completion. Often an exact answer may not be required, and a user may prefer a fast, approximate answer. For example, during a drill-down query sequence in data mining, initial queries frequently have the sole purpose of determining the truly interesting queries and regions of the database. Providing (reasonably accurate) approximate answers to these initial queries gives users the ability to focus their examinations quickly and effectively, without consuming large amounts of system resources. An approximate answer can also provide useful feedback on the quality of a query, allowing users to make informed decisions on whether they would like to spend more time and resources to execute their queries to completion. For queries requesting a numerical answer (e.g., total revenues or annual percentage), often the full precision of the exact answer is not needed and the first few digits of precision will suffice (e.g., the leading few digits of a total in the millions or the nearest percentile of a percentage.)

One prior art approximate querying method involves sampling. Sampling is based on the use of uniform, random samples to create synopses of the electronic data. The synopses are then queried to produce approximate query answers. Known methods based on sampling involve querying synopses in an attempt to extract desired information from the electronic data. Random samples of a data collection typically provide accurate estimates for aggregate operators (i.e., count, sum, average, etc.) However, random samples for non-aggregate operators (i.e., select, project, join, etc.) may provide undesirable results. For example, sampling techniques suffer from two inherent limitations which restrict their application as a general-purpose approximate query processing tool. First, it is known that a join operator applied on two uniform random samples results in a non-uniform sample of the join result. Thus, join operations lead to degradations in the quality of the approximate answer. Second, for a non-aggregate query, execution over random samples of the data will produce very small subsets of the exact query answer. For example, since sampling produces small subsets of the original data, the desired results may be discarded in the process of generating the samples. Therefore, since sampling is performed prior to querying, a non-aggregate query operator such as select applied on the small subsets of data will produce limited results, if any.

Another known approximate querying method involves the use of histograms. In a histogram method, data is grouped by ranges. By using histograms, synopses of the data can be created which leads to improved querying speeds. However, it is known that histogram-based approaches become problematic when dealing with high-dimensional data sets that are typical of modern systems. The reason is that as the dimensionality of the data increases, both the storage overhead (i.e., number of memory locations) and the construction cost of the histograms that can achieve reasonable error rates increase exponentially.

Accordingly, approximate querying processing methods which efficiently provide fast and accurate query results for aggregate and non-aggregate queries would be useful.

SUMMARY OF THE INVENTION

The present invention relates to approximate query methods for querying electronic data. The approximate query method of the present invention comprises: generating wavelet-coefficient synopses of the electronic data; querying the wavelet-coefficient synopses using modified standard (aggregate and non-aggregate) SQL operators implemented using novel query processing algorithms to obtain a wavelet-coefficient result; and rendering the wavelet-coefficient result to obtain an approximate result.

In the present invention, the querying occurs entirely in the wavelet-coefficient domain; that is, both the input(s) and the output of the query operators are compact collections of wavelet coefficients which capture the underlying data. This delays the expansion of the wavelet-coefficient synopses to the end of the querying process, thus allowing for extremely fast approximate querying.

The wavelet-coefficient synopses is generated by decomposing the electronic data into wavelet coefficients. A small set of the wavelet coefficients is then retained (using a threshold scheme) to create a compact, wavelet-coefficient synopses of the original data.

DETAILED DESCRIPTION OF THE INVENTION

The present invention relates to querying electronic data to derive approximate results. In the present invention, electronic data is queried using a method comprising the following steps: generating wavelet-coefficient synopses of the electronic data; querying the wavelet-coefficient synopses using modified standard (aggregate and non-aggregate) SQL operators implemented using novel query processing algorithms to obtain a wavelet-coefficient result; and rendering the wavelet-coefficient result to obtain an approximate result. In a preferred embodiment, the electronic data is relational data housed in one or more relational databases and the approximate result is an approximate relational result.

In the present invention, the wavelet-coefficient synopses are generated by decomposing the electronic data to be queried into wavelet-coefficients. The wavelet-coefficients are then subjected to a thresholding scheme to develop wavelet-coefficient synopses of the electronic data. The wavelet-coefficient synopses are a very compact representation of the data to be queried. Since the data is compact, it can be queried very quickly. In a preferred embodiment, multi-dimensional Haar wavelets are employed to generate the wavelet-coefficients, however, other types of wavelets could be employed.

I. Wavelet Coefficient Synopses

In the present invention, wavelet-coefficient synopses of electronic data are generated by decomposing the electronic data into wavelet-coefficients using a wavelet decomposition scheme and subjecting the wavelet-coefficients to a thresholding scheme.

Wavelets are a useful mathematical tool for efficiently decomposing data. Wavelet decomposition comprises a coarse overall approximation together with detail coefficients that influence the data. The wavelet decomposition has excellent energy compaction and de-correlation properties, which can be used to effectively generate compact representations that exploit the structure of data. In addition, wavelet transforms can be computed in linear time, thereby enabling the creation of very efficient algorithms. In a preferred embodiment, multi-dimensional Haar wavelet decomposition is used. Haar wavelets are conceptually simple, very fast to compute, and perform well in a variety of applications. Although Haar wavelets are used, other types of wavelets may be used in accordance with the present invention.

Figure 1A:
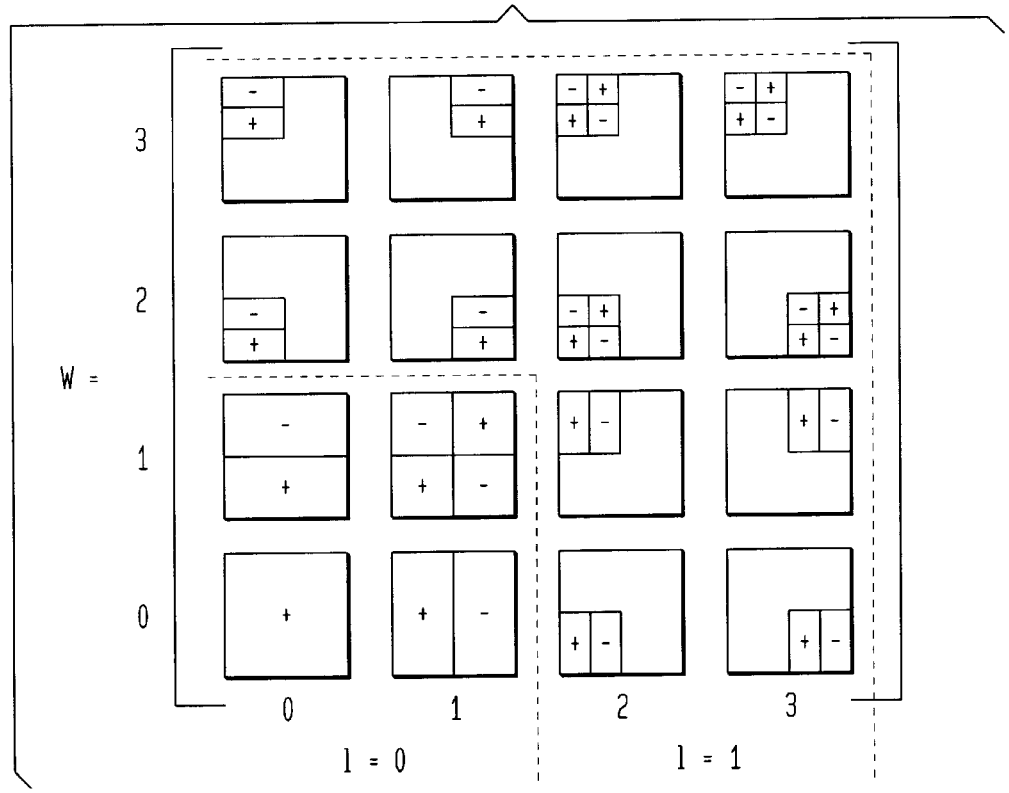
FIG. 1A is a block diagram depicting support regions and signs for sixteen non-standard two-dimensional Haar basis functions, in which the coefficient magnitudes are multiplied by +1 (−1) for a +(−) sign, respectively, appears, and is multiplied by 0 in blank areas, in accordance with the present invention.

Multi-Dimensional Haar Wavelets-Coefficients Semantics and Representation: Consider a wavelet coefficient W generated during the multi-dimensional Haar decomposition of a d-dimensional data array A. From a mathematical standpoint, this coefficient is essentially a multiplicative factor for an appropriate Haar basis function when the data in A is expressed using the d-dimensional Haar basis. Abstractly, the d-dimensional Haar basis function corresponding to a coefficient W is defined by (a) a d-dimensional rectangular support region in A that essentially captures the region of A's cells that W contributes to during reconstruction, and (b) the quadrant sign information that defines the sign (+or −) of W's contribution (i.e., +W or −W) to any cell contained in a given quadrant of its support rectangle. (Note that the wavelet decomposition process guarantees that this sign can only change across quadrants of the support region.) As an example, FIG. 1($a$) depicts the support regions and signs of the sixteen nonstandard, two-dimensional Haar basis functions for coefficients in the corresponding locations of a 4×4 wavelet transform array W. The blank areas for each coefficient correspond to regions of the data array whose reconstruction is independent of the coefficient, i.e., the coefficient's contribution is 0. Thus, W [0, 0] is the overall average that contributes positively (i.e., "+W [0, 0]") to the reconstruction of all values in the original array, whereas W [3, 3] is a detail coefficient that contributes (with the signs depicted in FIG. 2($a$)) only to values in the array's upper right quadrant.

To simplify the description, the distinction between a coefficient and its corresponding basis function is removed by representing a Haar wavelet coefficient with the triple W=(R, S, v), where:

1. W.R is the d-dimensional support hyper-rectangle of W enclosing all the cells in the data array A to which W contributes (i.e., the support of the corresponding basis function). This hyper-rectangle is represented by its low and high boundary values (i.e., starting and ending array cells) along each dimension j, $1 \leq j \leq d$. The low and high boundaries along dimension j are denoted by W.R.boundary[j].lo and W.R.boundary[j].hi, respectively. Thus, the coefficient W contributes to each data cell A[$i_1, \ldots, i_d$] satisfying the condition W.R.boundary[j].lo$\leq i_j \leq$W.R.boundary[j].hi for all dimensions j, $1 \leq j \leq d$. Note that the space required to store the support hyper-rectangle of a coefficient is 2 log N bits, where N denotes the total number of cells (i.e., the product of the dimension sizes) of A.

Figure 1B:
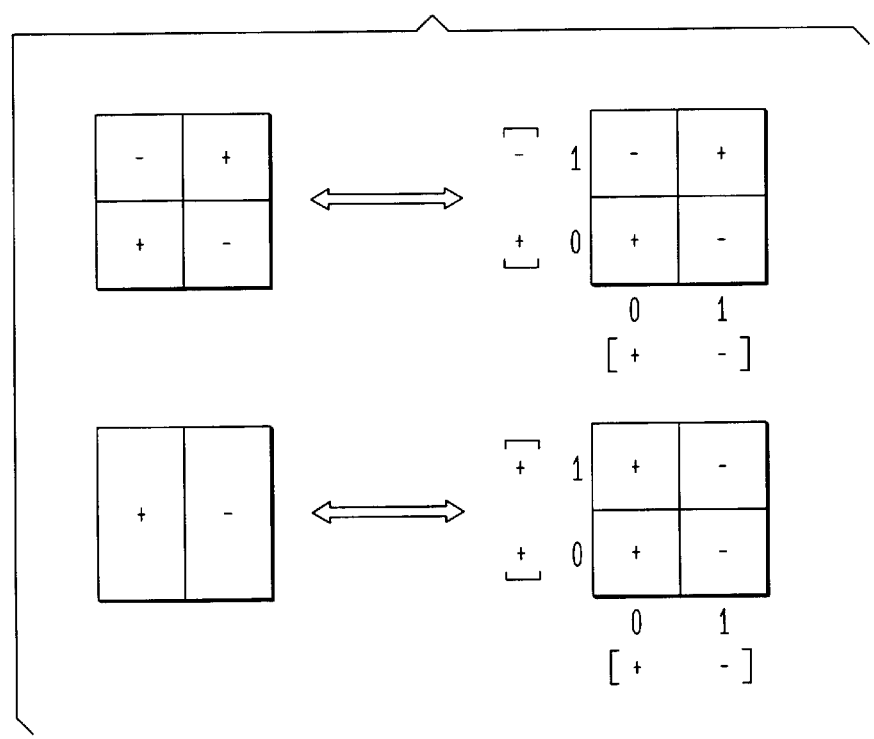
FIG. 1B is a block diagram representing quadrant sign information for coefficients using (per-dimension) sign vectors.
Figure 2:
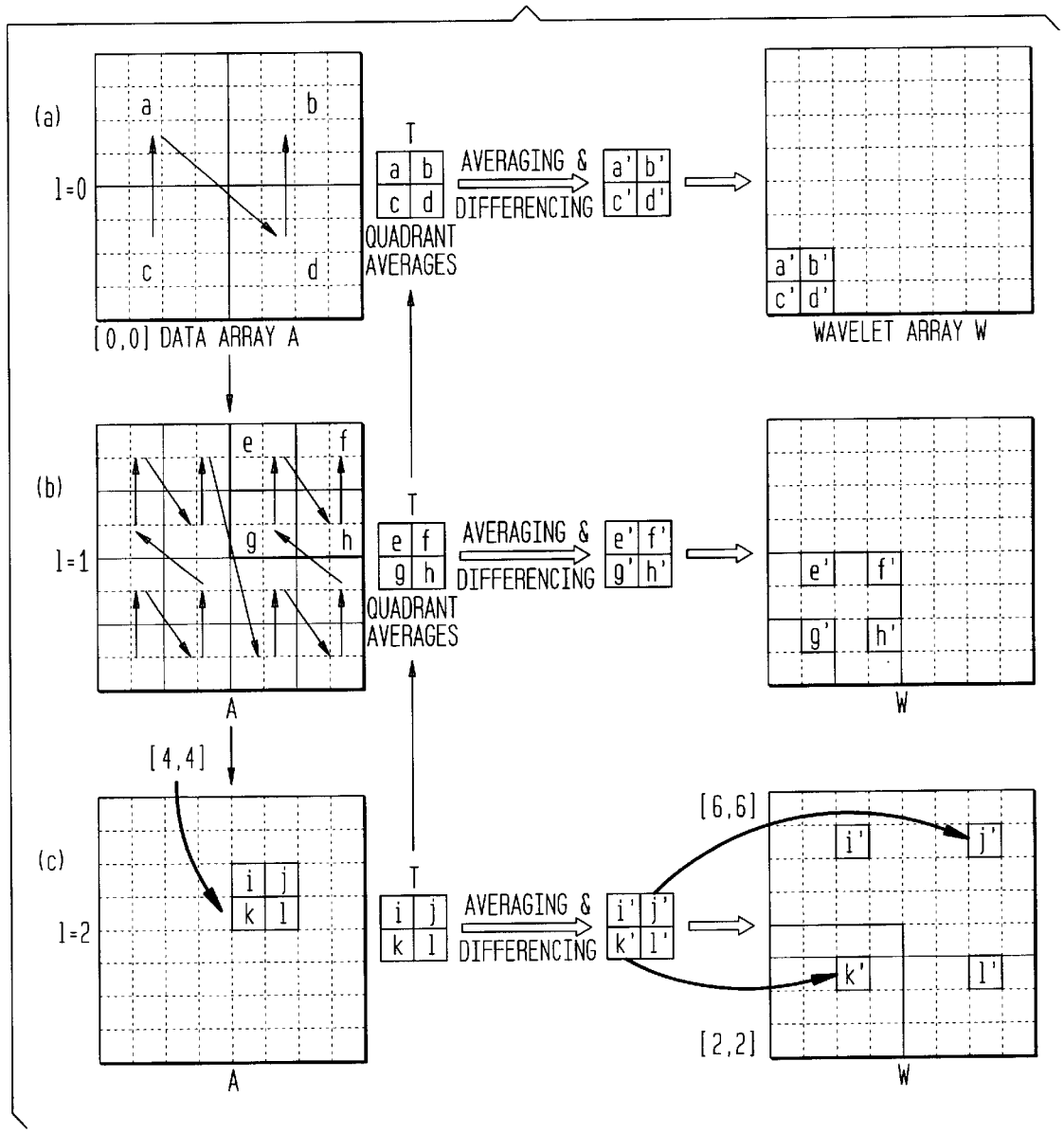
FIG. 2 is a block diagram depicting the computation of coefficients at different resolution levels during wavelet decomposition (ALGORITHM COMPUTEWAVELET)

2. W.S stores the sign information for all d-dimensional quadrants of W.R. Note that storing the quadrant sign information directly would mean a space requirement of $O(2^d)$, i.e., proportional to the number of quadrants of a d-dimensional hyper-rectangle. Instead, a more space-efficient representation of the quadrant sign information is used (using only 2d bits) that exploits the regularity of nonstandard multi-dimensional Haar basis functions. The basic observation here is that a nonstandard d-dimensional Haar basis is formed by scaled and translated products of d one-dimensional Haar basis functions. Thus, the idea is to store a 2-bit sign vector for each dimension j, that captures the sign variation of the appropriate one-dimensional basis function along that dimension. The two elements of the sign vector of coefficient W along dimension j are denoted by W.S.sign[j].lo and W.S.sign[j].hi, and contain the sign that corresponds to the lower and upper half of dimension j, respectively. Note that, by the properties of Haar bases, any coefficient generated during the decomposition of an input array, can only have two possible sign vector values along any dimension: ++ and +−, however, arbitrary join and select operators can introduce all possibilities (e.g., −+ or −−) for the contents of the sign vector of an intermediate result coefficient. Given the sign vectors along each dimension, the sign for each d-dimensional quadrant can be computed as the product of the d sign vector entries that map to that quadrant (i.e., following exactly the basis construction process). More formally, let $q=[b_1, b_2, \ldots, b_d]$ be the binary address of a d-dimensional quadrant of W.R with $b_j=0$ ($b_j=1$) signifying that q projects onto the lower (upper) half of W.R's boundary along dimension j. Then, treating a sign of +(−) as being equivalent to +1 (resp., −1), the sign of quadrant q can be defined as $\Pi^d_{j=1}(b_j*W.S.sign[j].hi+\bar{b}_j*W.S.sign[j].lo)$, where $\bar{b}_j$ denotes the complement of bit $b_j$. Consequently, using the d sign vectors (i.e., only 2d bits of space) allows the capture of the quadrant sign information for d-dimensional Haar wavelet coefficients. The quadrant addressing convention and sign computation methodology are depicted in FIG. 1(b) for two example coefficient hyper-rectangles from the two-dimensional basis of FIG. 1(a).

3. W.v is the (scalar) magnitude of coefficient W. This is exactly the quantity that W contributes (either positively or negatively, depending on W. S) to all data array cells enclosed in W.R.

Thus, the view of a d-dimensional Haar wavelet coefficient is that of a d-dimensional hyper-rectangle with a (non-zero) magnitude and a sign that may change across quadrants. Note that by the properties of the nonstandard Haar decomposition, given any pair of coefficients, their hyper-rectangles are either going to be completely disjoint or one is completely contained in the other, that is, coefficient hyper-rectangles cannot partially overlap. It is this containment relationships coupled with the sign-vector representation of quadrant signs that enables join operations to be performed directly over the wavelet-coefficient synopses. These containment relationships also define the level of resolution of d-dimensional Haar wavelet coefficients (and the appropriate normalization constants to produce an orthonormal basis). More specifically, the level of all coefficients that span the entire data domain is defined as 0 and the level of any other coefficient as the level of the minimal enclosing coefficient incremented by one. FIG. 2(a) depicts the two levels of resolution (1=0, 1) for a two-dimensional Haar basis function (and the corresponding coefficients).

A Single-Pass Algorithm for Computing the Wavelet Decomposition of a Relational Table: Consider a relational table R with d attributes $X_1, X_2, \ldots X_d$. A straightforward way of obtaining a wavelet-based synopsis of R would be to take the traditional two-dimensional array view of a relational table (with attributes on the x-axis and tuples on the y-axis), apply a two-dimensional wavelet decomposition on R, and retain a few large coefficients. It is highly unlikely, however, that this solution will produce a high-quality compression of the underlying data. The reason is that wavelets (like most compression mechanisms) work by exploiting clusters of constant or similar values, which are almost impossible when grouping together attributes that can have vastly different domains (e.g., consider an age attribute adjacent to a salary) attribute. Similar problems occur in the vertical grouping as well, since even sorting by some attribute(s) cannot eliminate large "spikes" for others. The algorithm of the present invention addresses these problems by taking a slightly different view of the d-attribute relational table R. The idea is that the information in R can be represented as a (sparse) d-dimensional array $A_R$, whose $j^{th}$ dimension is indexed by the values of attribute $X_j$ and whose cells contain the count of tuples in R having the corresponding combination of attribute values. Note that $A_R$ is essentially the (d-dimensional) joint frequency distribution of all the attributes of R.

In a preferred embodiment of the present invention, an efficient, single-pass algorithm is employed for constructing the multi-dimensional wavelet decomposition of $A_R$. The decomposition algorithm can efficiently work off of a traditional "multiset-of-tuples" view of R. The scheme for coefficient thresholding (that is, truncating the number of coefficients retained for R based on the amount of available space) and how these coefficients can be rendered to reconstruct an approximate version of R is described.

Notation: The notational conventions used in the presentation of the preferred decomposition algorithm and for discussion are presented. Let $D=\{D_1, D_2, \ldots, D_d\}$ denote the set of dimensions of $A_R$, where dimension $D_j$ corresponds to the value domain of attribute $X_j$. Without loss of generality, it is assumed that each dimension $D_j$ is indexed by the set of integers $\{0, 1, \ldots, |D_j|-1\}$, where $|D_j|$ denotes the size of dimension $D_j$. To summarize, the view of a relational table R is that of a d-dimensional array $A_R$ of size $N=\Pi^d_{j=1}|D_j|$ with the cell $A_R[i_1, i_2, \ldots, i_d]$ containing the count of tuples in R having $X_j=i_j$ for each attribute $1 \leq j \leq d$. Note that the joint frequency array $A_R$ typically will be very sparse, especially for the high-dimensional data sets. $N_z$ is defined to be the number of populated (i.e., nonzero) cells of $A_R$ (typically, $N_z \ll N$).

Table 1 outlines the notation used in the wavelet construction algorithm and later in the detailed description with a brief description of its semantics.

TABLE 1

Notation

| Symbol | Semantics |
|--------|-----------|
| d | Number of attributes (i.e., dimensionality) of the input relational table |

TABLE 1-continued

Notation

| Symbol | Semantics |
| --- | --- |
| R, $A_R$ | Relational table and corresponding d-dimensional joint frequency array |
| $X_j$, $D_j$ | $j^{th}$ attribute of relation R and corresponding domain of values ($1 \leq j \leq d$) |
| $D=\{D_1, \ldots, D_d\}$ | Set of all data dimensions of the (generic) array R |
| $A_R[i_1, i_2, \ldots, i_d]$ | Count of tuples in R with $X_j = i_j (i_j \in \{0, \ldots, |D_j|-1\})$, $\forall 1 \leq j \leq d$ |
| $N=\Pi_j|D_j|$ | Size (i.e., number of cells) of $A_R$ |
| $N_z$ | Number of nonzero cells of $A_R$ ($N_z << N$) |
| $W_R[i_1, i_2, \ldots, i_d]$ | Coefficient located at coordinates $[i_1, i_2, \ldots, i_d]$ of the wavelet transform array $W_R$ |
| W.R.boundary[j].{lo,hi} | Support hyper-rectangle boundaries along dimension $D_j$ for coefficient W ($1 \leq j \leq d$) |
| W.S.sign[j].{lo, hi} | Sign vector information along dimension $D_j$ for the wavelet coefficient W ($1 \leq j \leq d$) |
| W.S.signchange[j] | Sign-change value along dimension $D_j$ for the wavelet coefficient W ($1 \leq j \leq d$) |
| W.v | Scalar magnitude of the wavelet coefficient W |
| l | Current level of resolution of the wavelet decomposition |

Sign-change value vector W.S.signchange[j] captures the value along dimension j (between W.R.boundary[j].lo and W.R.boundary[j].hi) at which a transition in the value of the sign vector W.S.sign[j] occurs, for each $1 \leq j \leq d$. That is, W.S.sign[j].lo (W.S.sign[j].hi) applies to the range [W.R.boundary[j].lo, . . . , W.S.signchange[j]−1] (resp., W.S.signchange[j], . . . , W.R.boundary[j].hi). As a convention, W.S.signchange[j] is set to equal W.R.boundary [j].lo when there is no "true" sign change along dimension j, i.e., W.S.sign[j] contains [+,+] or [−,−]. Note that, for base Haar coefficients with a true sign change along dimensions, j, W.S.signchange[j] is simply the midpoint between W.R.boundary[j].lo and W.R.boundary[j].hi (FIG. 1). This property, however, no longer holds when arbitrary selections and joins are executed over the wavelet coefficients. As a consequence, sign-change values should be stored explicitly in order to support general query processing operations in an efficient manner.

Decomposition Algorithm

An efficient decomposition algorithm for constructing the multi-dimensional wavelet decomposition of $A_R$ in accordance with a preferred embodiment of the present invention is described. The algorithm exploits the interaction of the nonstandard wavelet decomposition and the "chunk-based" techniques that have recently been proposed for organizing high-dimensional data to perform the decomposition in a single pass over a relational table having very low memory requirements. More specifically, the algorithm assumes that the joint frequency array $A_R$ has been split into d-dimensional chunks that can fit entirely in main memory, with the contents of each chunk stored contiguously on disk. It is also shown that the extra memory required by the wavelet decomposition algorithm (in addition to the memory needed to store the chunk itself) is at most $O(2^d * \log (\max_j\{|D_j|\}))$.

The single-pass algorithm is based on the following key observation.

The wavelet decomposition of a d-dimensional array $A_R$ can be computed by independently computing the wavelet decomposition for each of the $2^d$ d-dimensional sub-arrays corresponding to $A_R$'s quadrants and then performing pair-wise averaging and differencing on the computed $2^d$ averages of $A_R$'s quadrants.

The final averaging and differencing step generates the coefficients at the lowest level of resolution (i.e., at level 0).

Furthermore, once the wavelet transform for a quadrant of $A_R$ has been computed, only its overall average needs to be kept in memory for the final averaging and differencing step. An efficient algorithm is devised by using the above observation to recursively compute the wavelet decomposition (consisting of coefficients at resolution level 1 and higher) for each quadrant Q of $A_R$ in terms of Q's own quadrants, and so on. The resolution level of coefficients generated increases with the depth of recursion. Also, at points during the computation, memory of the averages for all quadrants of Q are needed only if Q's wavelet decomposition has not yet been completed (i.e., the final averaging and differencing step for Q has not been performed). Thus, the algorithm is memory efficient since there can be at most one such "active" quadrant/sub-array Q for each level of resolution. Finally, the algorithm can run in a single pass over $A_R$ by considering each sub-array that fits in memory as a separate chunk that is stored contiguously on disk and loading the entire chunk into memory only once, when its wavelet decomposition is to be computed.

A preferred single-pass wavelet decomposition algorithm (termed COMPUTEWAVELET) is depicted in Table 2 below. To simplify the description, the COMPUTEWAVELET pseudo-code assumes that all dimensions of the data array $A_R$ are of equal size, i.e., $|D_1|=|D_2|= \ldots =|D_d|=2^m$. Besides the input joint frequency array ($A_R$) and the logarithm of the dimension size (m), COMPUTEWAVELET takes two additional arguments: (a) the root (i.e., "lower-left" endpoint) coordinates of the d-dimensional sub-array for which the wavelet transform is to be computed ($i_1, i_2, \ldots, i_d$), and (b) the current level of resolution for the wavelet coefficients (l). (Note that, for a given level of resolution l, the extent (along each dimension) of the d-dimensional array rooted at ($i_1, i_2, \ldots, i_d$) being processed is exactly $2^{m-1}$. The algorithm computes the wavelet-coefficients for the elements in the input sub-array and returns the overall average (step 13). COMPUTEWAVELET exploits chunked array organizations by working in a "depth-first" manner (all the computation required for decomposing an array chunk is done the first time the chunk is loaded into memory.) The idea is to recursively apply the wavelet decomposition on all the $2^d$ quadrants of the input array, producing the corresponding wavelet transforms for the next level of resolution (i.e., l+1). The overall averages for each of the $2^d$ quadrants are collected in a $2 \times \ldots \times 2 = 2^d$ temporary hyper-box T (Steps 2–4), where they are then pair-wise averaged and differenced to produce the overall average and detail coefficients for the level-1 decomposition of the input sub-array (Step 5). Finally, these level-1 wavelet coefficients are distributed to the appropriate locations of the wavelet transform array $W_R$, at which point their support hyper-rectangles and dimension sign vectors are also set (Steps 6–12). Thus, once a d-dimensional chunk of $A_R$ is loaded into memory, COMPUTEWAVELET computes the (nonstandard) wavelet coefficients at all levels for that chunk with no additional I/O's. This property ensures that the computation is completed in a single pass over the array data. The initial invocation of COMPUTEWAVELET is done with root $i_1, i_2, i_d)=(0, 0, \ldots, 0)$ and level $l=0$.

single pass over the "multiset-of-tuples" view of R. (This promotes efficiency, since the multi-dimensional array representation of R is typically extremely sparse, that is, $N_z<<N$.) The idea is to appropriately organize the tuples of R in a way that ensures that the tuple data is read and processed in the same order as that induced by the chunked storage and retrieval of the array $A_R$. An alternative method of achieving the same effect for the decomposition algorithm is to assume that the tuples of R have been sorted using z-order for mapping the d-dimensional space of $A_R$ onto a total linear order. A property of the z-order linearization is that all data cells belonging to regions generated by recursively dividing different dimensions in half are guaranteed to be contiguous in the z-order. This property ensures that the

TABLE 2

COMPUTEWAVELET: A single-pass wavelet decomposition algorithm.

```
procedure COMPUTEWAVELET(A_R, m, (i_1, i_2, ..., i_d), l)
begin
1.   if l ≧ m return A_R [i_1, ..., i_d]
2.   for t_1 := 0, 1 ... for t_d := 0, 1
3.       T[t_1, ..., t_d] := COMPUTEWAVELET(A_R, m, (i_1 + t_1 · 2^{m-1-1}, ..., i_d + t_d · 2^{m-1-1}), l + 1)
4.   end ... end
5.   perform pairwise averaging and differencing on the 2 x ... x 2 = 2^d hyper-box T
6.   for t_1 := 0, 1 ... for t_d := 0, 1
7.       W_R [t_1 · 2^1 + (i_1/2^{m-1}), ..., t_d · 2^1 + (i_d/2^{m-1})].v := T[t_1, ..., t_d]
8.       for j := 1, ..., d
9.           W_R [t_1 · 2^1 + (i_1/2^{m-1}), ..., t_d · 2^1 + (i_d/2^{m-1})].R.boundary [j] := [i_j, i_p + 2^{m-1} -1]
10.          W_R [t_1 · 2^1 + (i_1/2^{m-1}), ..., t_d · 2^1 + (i_d/2^{m-1})].S.sign [j] := (t_j = = 0) ? [+, +] : [+, -]
11.          W_R [t_1 · 2^1 + (i_1/2^{m-1}), ..., t_d · 2^1 + (i_d/2^{m-1})].S.sighchange [j] := (t_j = = 0) ? i_j : i_j + 2^{m-1}
12.      end
13.  end ... end
14.  return T[0, ..., 0]
end
```

Example: FIGS. 2(a), (b) and (c) illustrate the computation of a few of the detail coefficients for resolution levels 0, 1 and 2, respectively, for the 8×8 data array A. For each level 1, the sub-array of A that is input to COMPUTEWAVELET is enclosed in a bold rectangle and its four quadrants are labeled with one of "a," ..., "1." After collecting the averages for the four quadrants in T (by recursively invoking itself on each of the four quadrants), COMPUTEWAVELET performs averaging and differencing on them and finally distributes them in the wavelet transform array W, as shown in the figure. FIG. 2(b) illustrates the recursive invocation of COMPUTEWAVELET on quadrant "b" of the data array A (which returns the average for quadrant "b") while FIG. 2(c) represents its invocation on quadrant "g." Finally, FIG. 4(b) also depicts the order in which the wavelet decompositions for each of the 2×2 sub-arrays of A are computed by COMPUTEWAVELET.

With respect to the memory requirements of the algorithm, the only extra memory required by COMPUTEWAVELET (in addition to that needed to store the data chunk itself) is the memory for storing the temporary "averaging hyper-boxes" T. Each such hyper-box consists of exactly $2^d$ entries and the number of distinct hyper-boxes that can be "active" at any given point in time during the operation of COMPUTEWAVELET is bounded by the depth of the recursion, or equivalently, the number of distinct levels of coefficient resolution. Thus, the extra memory required by COMUTEWAVELET is at most $O(2^d \cdot m)$(when $|D_1|= \ldots |D_d|=2^m$) or $O(2^d \cdot \log(max_j\{|D_j|\}))$ (for the general case of unequal dimension extents).

Even though the discussion has been based on the chunked sparse array $A_R$ for conceptual simplicity, the wavelet decomposition algorithm can in fact work off a data tuples contained in any d-dimensional chunk of $A_R$ generated by recursive subdivisions of $A_R$ into quadrants are stored contiguously when R is sorted in z-order. The wavelet decomposition algorithm works in a single pass over R, assuming that the tuples of R have been stored on disk using a "chunked file" or the z-order linearization. An additional sorting step may be required if this assumption does not hold. If this sorting step is required, a logarithmic number of passes over the data is needed. FIG. 2(b) depicts the order in which COMPUTEWAVELET scans the data array $A_R$ during a two-dimensional wavelet decomposition process, demonstrating the direct correspondence between the order in which the algorithm accesses the tuples of R and z-order.

Both the hyper-rectangle and the sign information for any coefficient generated during the execution of COMPUTEWAVELET over a base relation R can be easily derived from the location of the coefficient in the wavelet transform array $W_R$, based on the regular recursive structure of the decomposition process. Thus, in order to conserve space, hyper-rectangle boundaries and sign vectors are not explicitly stored in the wavelet-coefficient synopses of base relations. (All that is needed are the coefficients' coordinates in $W_R$.) However, this information is stored explicitly for intermediate collections of wavelet coefficients generated during query processing.

Coefficient Thresholding: Given a limited amount of storage for maintaining the wavelet decomposition of a relational table R, only a certain number C of the wavelet coefficients stored in $W_R$ can be retained. (The remaining coefficients are implicitly set to 0.) Typically, $C<<N_z$, which implies that the chosen C wavelet coefficients form a highly compressed approximate representation of the original relational data. The goal of coefficient thresholding is to determine the "best" subset of C coefficients to retain, retaining coefficients which exceed a predefined threshold and disregarding the other coefficients, so that the error in the approximation is minimized.

The thresholding scheme employed in a preferred embodiment is to retain the C largest wavelet coefficients in absolute normalized value. It is known that (for any orthonormal wavelet basis) this thresholding method is optimal with respect to minimizing the overall mean squared error (i.e., $L^2$ error norm) in the data compression. Given that the goal is to support effective and accurate general query processing over such wavelet-compressed relational tables, the $L^2$ error norm will provide a reasonable aggregate metric of the accuracy of the approximation over all the individual tuples of R.

Symbol $W_R$ denotes the set of wavelet coefficients retained from the decomposition of R (i.e., the wavelet-coefficient synopsis of R).

Unequal Dimension Extents and Coefficient Normalization: If the sizes of the dimensions of $A_R$ are not equal, then the recursive invocation of COMPUTEWAVELET for quadrant $[t_1, \ldots, t_d]$ (Step 3) takes place only if the inequality $i_j + t_j * 2^{m-1-1} < |D_j|$ is satisfied for each $j=1, \ldots, d$. That means that, initially, quadrants along certain smaller dimensions are not considered by COMPUTEWAVELET; however, once quadrant sizes become smaller than the dimension size, computation of coefficients in quadrants for such smaller dimensions is initiated. Consequently, the pairwise averaging and differencing computation (Step 5) is performed only along those dimensions that are "active" in the current level of the wavelet decomposition. The support hyper-rectangles and dimension sign vectors for such active dimensions are computed as described in Steps 8–10, whereas for an "inactive" dimension j the hyper-rectangle boundaries are set at boundary[j]:=(0, $|D_j|-1$) (the entire dimension extent) and the sign vector is set at signs[j]=[+,+].

The coefficient values computed by COMPUTEWAVELET are normalized to ensure that the Haar basis functions are orthonormal and the coefficients are appropriately weighted according to their importance in reconstructing the original data. This is important when thresholding coefficients based on a given (limited) amount of storage space. When all dimensions are of equal extents (i.e., $|D_1|=D_2|= \ldots =|D_d|32\ 2^m$), coefficient values can be normalized by simply dividing each coefficient by $(\sqrt{(21)})^d$, where 1 is the level of resolution for the coefficient. For one-dimensional wavelets, this normalization ensures the orthonormality of the Haar basis. The following lemma shows how to extend the normalization process for non-standard Haar coefficients to the case of unequal dimension extents.

Lemma: Let W be any wavelet coefficient generated by pairwise averaging and differencing during the nonstandard d-dimensional Haar decomposition of $A=|D_1| \times \ldots \times |D_d|$. Also, let W.R.length[j]:=W.R.boundary[j].hi–W.R.boundary[j].lo +1 denote the extent of W along dimension j, for each $1 \leq j \leq d$. Then dividing the value W.v of each coefficient W by the factor $$\prod_j \sqrt{\frac{|D_j|}{W.R.length[j]}}$$

gives an orthonormal basis.

II. Querying in the Wavelet-coeffecent Domain

In a preferred embodiment of the invention, a query algorithm uses a modified algebra for querying wavelet-coefficient synopses. The basic operators of the modified algebra correspond directly to conventional relational algebra and SQL operators, including the (non-aggregate) select, project, and join operators as well as aggregate operators like count, sum, and average. However, the operators of the algebra in the preferred algebra are defined over the wavelet-coefficient domain; that is, the input(s) and output of each operator are sets of wavelet coefficients (rather than relational tables). The query algebra for wavelet coefficients provides efficient approximate query processing over wavelet-coefficient data synopses. Executing the query Q in the compressed wavelet-coefficient domain (essentially, postponing the rendering step until the final query result) offers tremendous advantages colloguial in the execution costs of (approximate) queries. Therefore, the operators (op) of the query processing algebra are defined over the wavelet-coefficient synopses, with the semantics depicted pictorially in the transition diagram of FIG. 3. The operator semantics ensure the valid execution of a query Q in the wavelet-coefficient domain. The idea is to ensure that for any operator (op), the approximate relation resulting from processing op in the wavelet-coefficient domain and rendering the resulting coefficients (i.e., the "right-then-down" path in FIG. 3) is identical to that obtained by first rendering the input(s) of op and then executing the corresponding relational operator on the resulting approximate relations (i.e., the "down-then-right" path). This can be translated to the equivalence of render(op($T_1, \ldots, T_k$)) to op(render ($T_1, \ldots, T_k$)), for each operator. Defining the operator algebra to satisfy these semantics allows the fast execution of any relational query Q entirely over the wavelet-coefficient domain, while ensuring that the (rendered) final result is identical to that obtained by executing Q on the approximate input relations.

Figure 3:
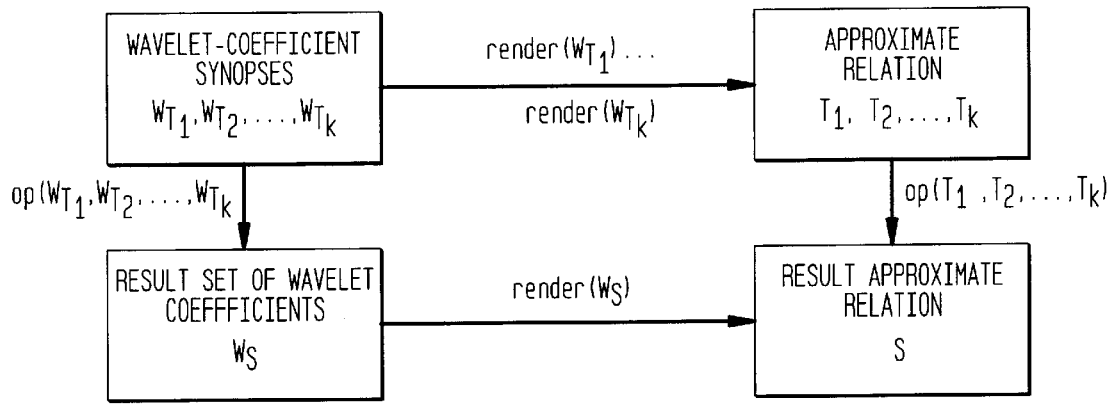
FIG. 3 is a block diagram of valid semantics for processing query operators over the wavelet-coefficient domain ($T_1, \ldots, T_k$ can be base relations or intermediate query results)

Each operator takes one or more set(s) of multi-dimensional wavelet coefficients as an input and appropriately combines and/or updates the components (i.e., hyper-rectangle, sign information, and magnitude) of these coefficients to produce a "valid" set of output coefficients (FIG. 3). All of the operators operate entirely in the wavelet-coefficient domain. Note that, while the wavelet coefficients (generated by COMPUTEWAVELET) for base relational tables have a very regular structure, the same is not necessarily true for the set of coefficients output by an arbitrary select or join operator. Nevertheless, the intermediate results of the algebra operators are referred to as "wavelet coefficients" since they are characterized by the exact same components as base-relation coefficients (e.g., hyper-rectangle, sign-vector) and maintain the exact same semantics with respect to the underlying approximate (intermediate) relation (i.e., the rendering process remains unchanged).

Selection Operator (Select): A selection operator in accordance with a preferred embodiment of the present invention has the general form $\text{select}_{pred}$ ($W_T$), where pred represents a generic conjunctive predicate on a subset of the d attributes in T, that is, pred=$(1_{i1} \leq X_{i1} \leq h_{i1})^\wedge \ldots {}^\wedge(1_{ik} \leq X_{ik} \leq h_{ik})$, where $1_{ij}$ and $h_{ij}$ denote the low and high boundaries of the selected range along each selection dimension $D_{ij}$, $j=1, 2, \ldots, k$, $k \leq d$. This is essentially a k-dimensional range selection, where the queried range is specified along k dimensions D'=$\{D_{i1}, D_{i2}, \ldots, D_{ik}\}$ and left unspecified along the remaining (d–k) dimensions (D–D'). Since D=$\{D_1, D_2, \ldots, D_d\}$, for each unspecified dimension $D_j \in$(D–D'), the selection range spans the full index domain along the dimension, that is, $1_j=0$ and $h_j=|D_j|-1$, for each $D_j \in$(D–D').

The select operator effectively filters out the portions of the wavelet coefficients in $W_T$ that do not overlap with the k-dimensional selection range, and thus do not contribute to cells in the selected hyper-rectangle. This process is illustrated pictorially in FIG. 4(a). More formally, let $W \in W_T$ denote any wavelet coefficient in the input set of the select operator. The approximate query execution engine processes the selection over W as follows. If W's support hyper-rectangle W.R overlaps the k-dimensional selection hyper-rectangle, that is, if for every dimension $D_{ij} \in D'$, the following condition is satisfied.

$1_{ij} \leq$ W.R.boundary$[i_j]$.lo $\leq h_{ij}$ or W.R.boundary$[i_j]$.lo $\leq 1_{ij} \leq$ W.R.boundary$[i_j]$.hi, then 1. For all dimensions $D_{ij} \in D'$ do
   1.1. Set W.R.boundary$[i_j]$.lo:=max$\{1_{ij}$, W.R.boundary$[i_j]$.lo$\}$ and W.R.boundary$[i_j]$.hi:=min$\{h_{ij}$, W.R.boundary$[i_j]$.hi$\}$.
   1.2. If W.R.boundary$[i_j]$.hi<W.S.signchange$[i_j]$ then set W.S.signchange$[i_j]$:=W.R.boundary$[i_j]$.lo and W.S.sign$[i_j]$:=[W.S.sign$[i_j]$.lo, W.S.sign$[i_j]$.lo].
   1.3. Else if W.R.boundary$[i_j]$.lo$\geq$W.S.signchange$[i_j]$ then set W.S.signchange$[i_j]$:=W.R.boundary$[i_j]$.lo and W.S.sign$[i_j]$:=[W.S.sign$[i_j]$.hi, W.S.sign$[i_j]$.hi].
2. Add the (updated) W to the set of output coefficients, that is, set $W_S := W_S \cup \{W\}$, where S=select$_{pred}$(T).

Note that the select processing algorithm chooses (and appropriately updates) only the coefficients in $W_T$ that overlap with the k-dimensional selection hyper-rectangle. For each such coefficient, the algorithm (a) updates the hyper-rectangle boundaries according to the specified selection range (Step 1.1), and (b) updates the sign information, if such an update is necessary (Steps 1.2–1.3). The sign information along the queried dimension $D_{ij}$ needs to be updated only if the selection range along $D_{ij}$ is completely contained in either the low (1.2) or the high (1.3) sign-vector range of the coefficient along $D_{ij}$. In both cases, the sign-vector of the coefficient is updated to contain only the single sign present in the selection range and the coefficient's sign-change is set to its leftmost boundary value (since there is no change of sign along $D_{ij}$ after the selection). The sign-vector and sign-change of the result coefficient remain untouched (i.e., identical to those of the input coefficient) when the selection range spans the original sign-change value.

Figure 4A:
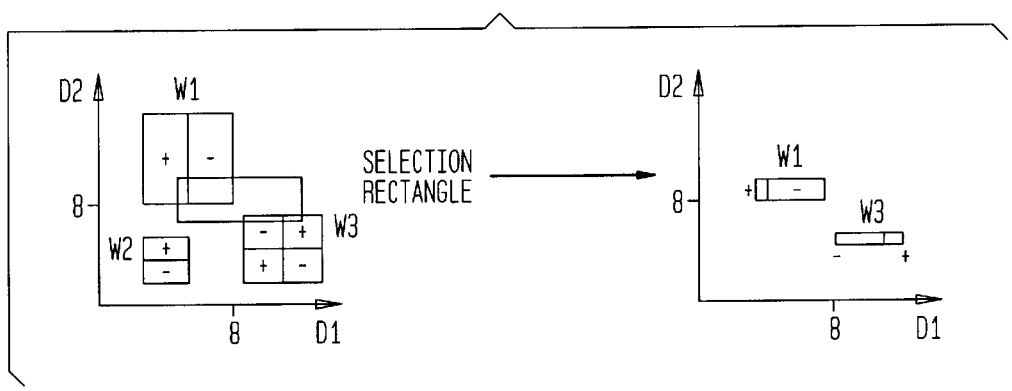
FIG. 4A is a block diagram representing the processing of selection operations in the wavelet-coefficient domain in accordance with the present invention.

Example: Consider the wavelet coefficient $W_3$ in FIG. 4(a) and let its hyper-rectangle ranges be defined as $W_3$.R.boundary$[1]$=$[9, 15]$ and $W_3$.R.boundary$[2]$=$[2, 7]$. Further, the sign information for $W_3$ is captured by $W_3$.S.sign$[1]$=$[+,-]$, $W_3$.S.sign$[2]$=$[+,-]$ (FIG. 1(b)), $W_3$.S.signchange$[1]$=12, and $W_3$.S.signchange$[2]$=4. The updates to $W_3$ are illustrated when a select operator with the 2-dimensional selection hyper-rectangle shown in FIG. 4(a) is applied. The boundaries of the selection hyper-rectangle along dimension $D_1$ and $D_2$ are $[1_1, h_1]$=$[4, 13]$ and $[1_2, h_2]$=$[5, 10]$, respectively.

Since $W_3$'s hyper-rectangle overlaps with the selection hyper-rectangle, it is processed by the select operator as follows. First, in Step 1.1, the hyper-rectangle boundaries of $W_3$ are updated to $W_3$.R.boundary$[1]$:=$[9, 13]$ and $W_3$.R.boundary$[2]$:=$[5, 7]$ (i.e., the region that overlaps with the select ranges along $D_1$ and $D_2$). Since $W_3$.S.signchange$[1]$=12 which is between 9 and 13 (the new boundaries along $D_1$), the sign information along $D_1$ is not updated. Along dimension $D_2$, however, there is $W_3$.S.signchange$[2]$=4 which is less than $W_3$.R.boundary$[2]$.lo=5, and so Step 1.3 updates the sign information along $D_2$ to $W_3$.S.sign$[2]$:=$[-,-]$ and $W_3$.S.signchange$[2]$:=5 (i.e., the low boundary along $D_2$).

Projection Operator (Project): A projection operator in accordance with a preferred embodiment of the present invention has the general form project $X_{i1}, \ldots, X_{ik}$ ($W_T$), where the k projection attributes $X_{i1}, \ldots, X_{ik}$ form a subset of the d attributes of T. Letting $D' = \{D_{i1}, \ldots, D_{ik}\}$ denote the $k \leq d$ projection dimensions, projecting out the d–k dimensions in (D–D') is of interest. A general method for projecting out a single dimension $D_j \in D$–D' is given. This method can then be applied repeatedly to project out all of the dimensions in D–D', one dimension at a time.

Consider T's corresponding multi-dimensional array $A_T$. Projecting a dimension $D_j$ out of $A_T$ is essentially equivalent to summing up the counts for all the array cells in each one-dimensional "row" of $A_T$ along dimension $D_j$ and then assigning this aggregated count to the single cell corresponding to that row in the remaining dimensions (D–$\{D_j\}$). Consider any d-dimensional wavelet-coefficient W in the project operators input set $W_T$. W contributes a value of W.v to every cell in its support hyper-rectangle W.R. Furthermore, the sign of this contribution for every one-dimensional row along dimension $D_j$ is determined as either W.S.sign$[j]$.hi (if the cell lies "above" W.S.signchange$[j]$) or W.S.sign$[j]$.lo (otherwise). Thus, the coefficient W can be worked on directly to project out dimension $D_j$ by simply adjusting the coefficient's magnitude with an appropriate multiplicative constant W.v.=W.v*$p_j$, where:

$p_j$=(W.R.boundary$[j]$.hi−W.S.signchange$[j]$+1)*W.S.sign$[j]$.hi +

(W.S.signchange$[j]$−W.R.boundary$[j]$.lo)*W.S.sign$[j]$.lo. (1)

Figure 4B:
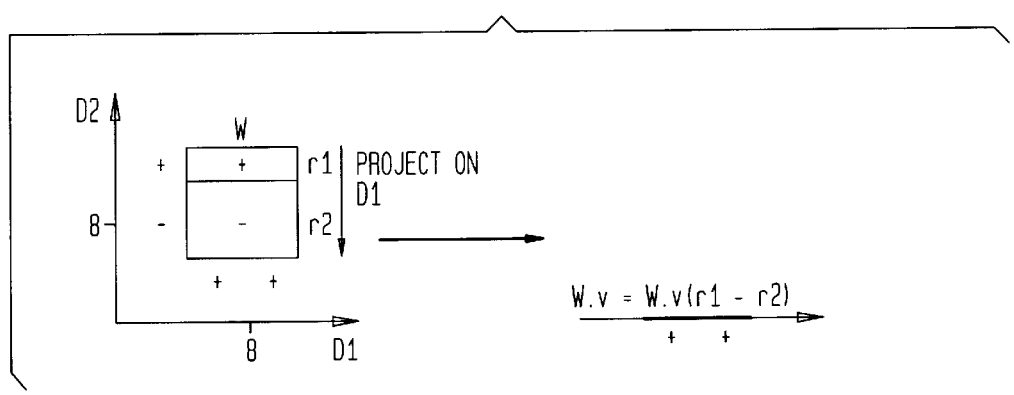
FIG. 4B is a block diagram of the processing of projection operations in the wavelet-coefficient domain in accordance with the present invention.

A two-dimensional example of projecting out a dimension in the wavelet-coefficient domain is depicted in FIG. 4(b). Multiplying W.v with $p_j$ (Equation (1)) effectively projects out dimension $D_j$ from W by summing up W's contribution on each one-dimensional row along dimension $D_j$. Besides adjusting W.v, dimension $D_j$ needs to be discarded from the hyper-rectangle and sign information for W, since it is now a (d−1)-dimension coefficient (on dimensions D−$\{D_j\}$). If the coefficient's sign-change lies in the middle of its support range along dimension $D_j$ (e.g., see FIG. 1(a)), then its adjusted magnitude will be 0, which means that it can safely be discarded from the output set of the projection operation.

Repeating the process for each wavelet coefficient $W \in W_T$ and each dimension $D_j \in D$–D' gives the set of output wavelet coefficients $W_S$, where S=project$_D$(T). Equivalently, given a coefficient W, we can set W.v:=W.v $\Pi_{D_j \in D-D'} p_j$ (where $p_j$ is as defined in Equation (1)) and discard dimensions D–D' from W's representation.

Example: Consider the wavelet coefficient W in FIG. 4(b). Assume that the hyper-rectangle and sign information for W along dimension $D_2$ are as follows: W.R.boundary$[2]$=$[4, 11]$, W.S.sign$[2]$=$[-,+]$, and W.S.signchage$[2]$=10. Also, let the magnitude of W be W.v=2. Then, projecting W on dimension $D_1$ causes W.v to be updated to W.v:=2*((11−10+1)−(10−4))=−8.

Join Operator (Join): A join operator in accordance with a preferred embodiment of the present invention has the general form join$_{pred}$($W_{T1}$, $WT_2$), where $T_1$ and $T_2$ are (approximate) relations of arity $d_1$ and $d_2$, respectively, and pred is a conjunctive k-ary equi-join predicate of the form $(X_{11}=X_{21})^{\wedge} \ldots ^{\wedge} (X_{1k}=X_{2k})$, where $X_{ij}$ ($D_{ij}$) (j=1, \ldots, $d_i$) denotes the $j^{th}$ attribute (resp., dimension) of $T_i$ (i=1, 2). (Without loss of generality, the join attributes are assumed to be the first $k \leq \min\{d_1, d_2\}$ attributes of each joining relation.) Note that the result of the join operation $W_S$ is a set of ($d_1+d_2$−K)-dimensional wavelet coefficients; that is, the join operation returns coefficients of (possibly) different arity than any of its inputs.

Figure 5A:
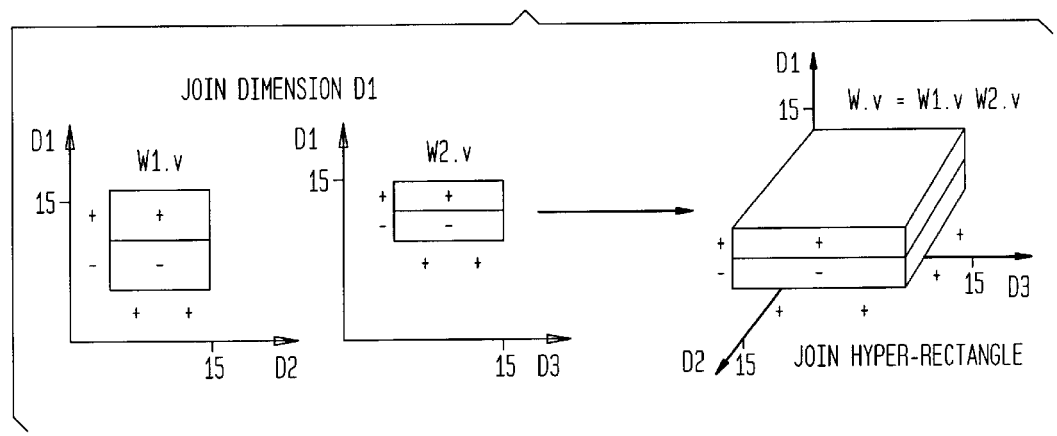
FIG. 5A is a block diagram representing the processing join operations in the wavelet-coefficient domain in accordance with the present invention.

To see how the join processing algorithm works, consider the multi-dimensional arrays $A_{T1}$ and $A_{T2}$ corresponding to the join operator's input arguments. Let $(i^1_1, \ldots, i^1_{d1})$ and $(i^2_1, \ldots, i^2_{d2})$ denote the coordinates of two cells belonging to $A_{T1}$ and $A_{T2}$, respectively. If the indexes of the two cells match on the join dimensions, i.e., $i^1_1=i^2_1, \ldots, i^1_k=i^2_k$, then the cell in the join result array $A_S$ with coordinates $(i^1_1, \ldots, i^1_{d1}, i^2_{k+1}, \ldots, i^2_{d2})$ is populated with the product of the count values contained in the two joined cells. Since the cell counts for $A_T$ are derived by appropriately summing the contributions of the wavelet coefficients in $W_T$ and a numeric product can be distributed over a summation, the join operator can be processed entirely in the wavelet-coefficient domain by considering all pairs of coefficients from $W_{T1}$ and $W_{T2}$. Briefly, for any two coefficients from $W_{T1}$ and $W_{T2}$ that overlap in the join dimensions (i.e., contribute to joining data cells) an output coefficient is defined with a magnitude equal to the product of the two "joining" coefficients and a support hyper-rectangle with ranges that are (a) equal to the overlap of the two coefficients for the k (common) join dimensions, and (b) equal to the original coefficient range along any of the $d_1+d_2-(2*k)$ remaining dimensions. The sign information for an output coefficient along any of the k join dimensions is derived by appropriately multiplexing the sign-vectors of the "joining" coefficients along that dimension, taking care to ensure that only signs along the overlapping portion are taken into account. (The sign information along non-join dimensions remains unchanged.) An example of this process in two dimensions ($d_1=d_2=2$, $k=1$) is depicted in FIG. 5(a).

The approximate query execution strategy for joins can be described as follows: (To simplify the notation, the "½" superscripts are ignored and the join dimensions are denoted as $D_1, \ldots, D_k$, and the remaining $d_1+d_2-(2*k)$ dimensions as $D_{k+1}, \ldots, D_{d1+d2-k}$.) For each pair of wavelet coefficients $W_1 \in W_{T1}$ and $W_2 \in W_{T2}$, if the coefficients' support hyper-rectangles overlap in the k join dimensions; that is, if for every dimension $D_i$, $i=1, \ldots k$, the following condition is satisfied:

$W_1$.R.boundary.lo[i] $\leq W_2$.R.boundary.lo[i] $\leq W_1$.R.boundary.hi[i] or
$W_2$.R.boundary.lo[i] $\leq W_1$.R.boundary.lo[i] $\leq W_2$.R.boundary.hi[i], then the corresponding output coefficient $W \in W_S$ is defined in the following steps.

1. For all join dimensions $D_i$, $i=1, \ldots, k$ do
    1.1. Set W.R.boundary[i].lo:=max{$W_1$.R.boundary[i].lo, $W_2$.R.boundary[i].lo} and W.R.boundary[i].hi:=min{$W_1$.R.boundary[i].hi, $W_2$.R.boundary[i].hi}.
    1.2. For $j=1,2$/*let $s_j$ be a temporary sign-vector variable */
        1.2.1. If W.R.boundary[i].hi<$W_j$.S.signchange[i] then set $s_j$:=[$W_j$.S.sign[i].lo, $W_j$.S.sign[i].lo].
        1.2.2. Else if W.R.boundary[i].lo$\geq W_j$.S.signchange[i] then set $s_j$:=[$W_j$.S.sign[i].hi, $W_j$.S.sign[i].hi].
        1.2.3. Else set $s_j$:=$W_j$.S.sign[i].
    1.3. Set W.S.sign[i]:=[$s_1$.lo*$s_2$.lo, $s_1$.hi*$s_2$.hi].
    1.4. If W.S.sign[i].lo==W.S.sign[i].hi then set W.S.signchange[i]:=W.R.boundary[i].lo.
    1.5 Else set W.S.signchange[i]:=$\max_{j=1,2}$ {$W_j$.S.signchange[i]: $W_j$.S.signchange[i]$\in$ [W.R.boundary[i].lo, W.R.boundary[i].hi]}.
2. For each (non-join) dimension $D_i$, $i=k+1, \ldots, d_1$ do: Set W.R.boundary[i]:=$W_1$.R.boundary[i], W.S.sign[i]:=$W_1$.S.sign[i], and W.S.signchange[i]:=$W_1$.S.signchange[i].
3. For each (non-join) dimension $D_i$, $i=d_{1+1}, \ldots, d_1+d_2-k$; do: Set W.R.boundary[i]:=$W_2$.R.boundary[i-$d_1$+k],W.S.sign[i]:=$W_2$.S.sign[i-$d_1$+k], and $W_2$.S.signchange[i]:=$W_2$.S.signchange[i-$d_1$+k].
4. Set W.v:=$W_1$.v*$W_2$.v and $W_S$:=$W_S \cup \{W\}$, where S=$\text{join}_{pred}(W_{T1}, W_{T2})$.

Note that the bulk of the join processing algorithm concentrates on the correct settings for the output coefficient W along the k join dimensions (Step 1), since the problem becomes trivial for the $d_1+d_2-(2*k)$ remaining dimensions (Steps 2–3). Given a pair of "joining" input coefficients and a join dimension $D_i$, the algorithm starts out by setting the hyper-rectangle range of the output coefficient W along $D_i$ equal to the overlap of the two input coefficients along D (Step 1.1). Next, W's sign information along join dimension $D_i$ (Steps 1.2–1.3) is computed, which is slightly more involved. ($T_1$ and $T_2$ are (possibly) the results of earlier select and/or join operators, which means that their rectangle boundaries and signs along $D_i$ can be arbitrary.) The idea is to determine, for each of the two input coefficients $W_1$ and $W_2$, where the boundaries of the join range lie with respect to the coefficient's sign-change value along dimension $D_i$. Given an input coefficient $W_j$($J=1,2$), if the join range along $D_i$ is completely contained in either the low (1.2.1) or the high (1.2.2) sign-vector range of $W_j$ along $D_i$, then a temporary sign-vector $s_j$ is appropriately set (with the same sign in both entries). Otherwise, i.e., if the join range spans $W_j$'s sign-change (1.2.3), then $s_j$ is set to $W_j$'s sign-vector along $D_i$. Thus, $s_j$ captures the sign of coefficient $W_j$ in the joining range, and multiplying $s_1$ and $s_2$ (element-wise) yields the sign-vector for the output coefficient W along dimension $D_i$ (Step 1.3). If the resulting sign vector for W does not contain a true sign change (i.e., the low and high components of W.S.sign[i] are the same), then W's sign-change value along dimension $D_i$ is set equal to the low boundary of W.R along $D_i$, according to the convention (Step 1.4). Otherwise, the sign-change value for the output coefficient W along $D_i$ is set equal to the maximum of the input coefficients' sign-change values that are contained in the join range (i.e., W.R's boundaries) along $D_i$ (Step 1.5).

Figure 5B:
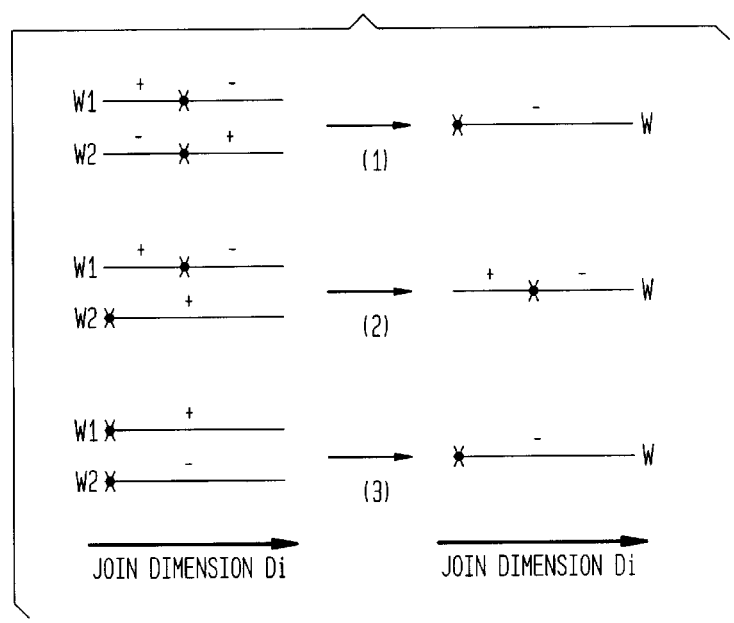
FIG. 5B is a block diagram representing computing sign information for join output coefficients in accordance with the present invention.

In FIG. 5(b), three common scenarios for the computation of W's sign information along the join dimension $D_i$ are illustrated. More specifically, the left-hand side of the figure shows three possibilities for the sign information of the input coefficients $W_1$ and $W_2$ along the join range of dimension $D_i$ (with crosses denoting sign changes). The right-hand side depicts the resulting sign information for the output coefficient W along the same range. Observe that with respect to the sign-information computation in Steps 1.3–1.5, the join range along any join dimension $D_i$ can contain at most one true sign-change. Meaning that if the sign for input coefficient $W_j$ actually changes in the join range along $D_i$, then this sign-change value is unique, that is, the two input coefficients cannot have true sign-changes at distinct points of the join range. This follows from the complete containment property of the base coefficient ranges along dimension $D_i$ (Section 2.1.2). (Note that the algorithm for select retains the value of a true sign change for a base coefficient if it is contained in the selection range, and sets it equal to the value of the left boundary otherwise.) This range containment along $D_i$ basically ensures that if $W_1$ and $W_2$ both contain a true sign-change in the join range (i.e., their overlap) along $D_i$, then that will occur at exactly the same value for both (as illustrated in FIG. 5(b.1)). Thus, in Step 1.3, $W_1$'s and $W_2$'s sign-vectors in the join range can be multiplied to derive W's sign-vector. If, on the other hand, one of $W_1$ and $W_2$ has a true sign change in the join range (as shown in FIG. 5(b.2)), then the max operation of Step 1.5 will correctly set the sign-change of W along $D_i$ to the true sign-change value (since the other sign-change will either be the left boundary or outside the join range). Finally, if neither $W_1$ nor $W_2$ have a true sign change in the join range, then the high and low components of W's sign vector will be identical and Step 1.4 will set W's sign-change value correctly.

Example: Consider the wavelet coefficients $W_1$ and $W_2$ in FIG. 5. Let the boundaries and sign information of $W_1$ and $W_2$ along the join dimension $D_1$ be as follows: $W_1$.R.boundary[1]=[4,15], $W_2$.R.boundary[1]=[8,15], $W_1$.S.sign[1]=[-,+], $W_2$.S.sign[1]=[-,+], $W_1$.S.signchange [1]=8, and $W_2$.S.signchange[1]=12. In the following, the computation of the hyper-rectangle and sign information for join dimension $D_1$ for the coefficient W that is output by the algorithm when $W_1$ and $W_2$ are "joined" is illustrated. Note that for the non-join dimensions $D_2$ and $D_3$, this information for W is identical to that of $W_1$ and $W_2$ (respectively), so we focus solely on the join dimension $D_1$.

First, in Step 1.1, W.R.boundary[1] is set to [8, 15], i.e., the overlap range between $W_1$ and $W_2$ along $D_1$. In Step 1.2.2, since W.R.boundary[1].lo=8 is greater than or equal to $W_1$.S.signchange[1]=8, set $s_2$=[+,+]. In Step 1.2.3, since $W_2$.S.signchange[1]=12 lies in between W.R's boundaries, set $s_2$=[-,+]. Thus in Step 1.3, W.S.sign[1] is set to the product of $s_1$ and $s_2$ which is [-,+]. Finally, in step 1.5, W.S.signchange[1] is set to the maximum of the sign change values for $W_1$ and $W_2$ along dimension $D_1$, or W.S.signchange[1]:=max{8,12}=12.

Aggregate Operators (i.e., Count. Sum. Average. etc.): In the present invention, conventional aggregation operators, like count, sum, and average, are realized by the approximate query execution engine in the wavelet-coefficient domain. The input to each aggregate operator is a set of wavelet coefficients $W_T$. If the aggregation is not qualified with a GROUP-BY clause, then the output of the operator is a simple scalar value for the aggregate. In the more general case, where a GROUP-BY clause over dimensions D'={$D_1$, ..., $D_k$} has been specified, the output of the aggregate operator consists of a k-dimensional array spanning the dimensions in D', whose entries contain the computed aggregate value for each cell.

Count Operator (count): A count operator in accordance with a preferred embodiment of the present invention has the general form $count_{D'}(W_T)$, where the k GROUP-BY dimensions D'={$D_{i1}$, ..., $D_{ik}$} form a (possibly empty) subset of the d attributes of T. Counting is the most straightforward aggregate operation to implement in the framework, since each cell in the approximate multi-dimensional array already stores the count in-formation for that cell. Thus, processing $count_{D'}(W_T)$ is done by simply projecting each input coefficient onto the GROUP-BY dimensions D' and rendering the result into a multi-dimensional array of counts, as follows:

1. Let $W_S := \text{project}_{D'}(W_T)$.
2. Let $A_S := \text{render}(W_S)$ and output the cells in the |D'|-dimensional array $A_S$ with non-zero counts.

Sum Operator (sum): A summation operator in accordance with a preferred embodiment of the present invention has the general form $sum_{D'}(W_T, D_j)$, where D'={$D_{i1}$, ..., $D_{ik}$} denotes the set of GROUP-BY dimensions and $D_j \notin D'$ corresponds to the attribute of T whose values are summed. In a preferred embodiment, the sum operator is implemented in three steps. First, the input coefficients $W_T$ are projected on dimensions $D' \cup \{D_j\}$. Second, for each coefficient W output by the first step and for each row of cells along the summation attribute $D_j$, the sum of the product of the coefficient's magnitude W.v and the index of the cell along $D_j$ is computed. To simplify the exposition, it is assumed that the (integer) cell index values along dimension $D_j$ are identical to the domain values for the corresponding attribute $X_j$ of T. If that is not the case, then a reverse mapping from the $D_j$ index values to the corresponding values of $X_j$ is needed to sum the attribute values along the boundaries of a coefficient. The sum (essentially, an integral along $D_j$) is then assigned to the coefficient's magnitude W.v and the summing dimension $D_j$ is discarded. Thus, at the end of this step, W.v stores the contribution of W to the summation value for every |D'|-dimensional cell in W.R. Third, the resulting set of wavelet coefficients is rendered to produce the output multi-dimensional array on dimensions D'. More formally, the $sum_{D'}(W_T, D_j)$ query processing algorithm comprises the following steps.

1. Let $W_S := \text{project}_{D' \cup \{Dj\}}(W_T)$
2. For each wavelet coefficient $W \in W_S$ do
    2.1. Set W.v according to the following equation:

$$W.v := W.v \cdot \left( W.S.sign[j].lo \cdot \sum_{k=W.R.boundary[j].lo}^{W.S.signchange[j]-1} k + W.S.sign[j].hi \cdot \sum_{k=W.S.signchange[j]}^{W.R.boundary[j].hi} \right).$$

The summation of index values along $D_j$ in the above formula can be expressed in closed form using straightforward algebraic methods.

2.2. Discard dimension $D_j$ from the hyper-rectangle and sign information for W.
3. Let $A_S := \text{render}(W_S)$ and output the cells in the |D'|-dimensional array $A_S$ with non-zero values for the summation.

Average Operator (average): An averaging operator in accordance with a preferred embodiment of the present invention is designated by $average_{D'}(W_T, D_j)$ (where D' is the set of GROUP-BY dimensions and $D_j \notin D'$ corresponds to the averaged attribute of T) is implemented by combining the computation of $sum_{D'}(W_T, D_j)$ and $count_{D'}(W_T)$. The attribute sums and tuple counts for every cell over the data dimensions in the GROUP-BY attributes D' is computed. The resulting coefficients are rendered and the average value (i.e., the ratio of sum over count) is output for every cell with a non-zero sum and count.

III. Rendering

Reconstructing the Approximate Relation: A final step for a lossy data compression scheme is to reconstruct an approximate version of the original data from a compressed representation. This translates to rendering a given set of wavelet coefficients $W_S = \{W_i = (R_i, S_i, v_i)\}$ corresponding to a relational table S, to produce an "approximate version" of S denoted by $\text{render}(W_S)$. Note that S can be either a base relation or the result of a query on base relations, since all the query processing is done directly over the wavelet coefficient domain, rendering the final result can be done at the root of the query plan or as a post-processing step.

The purpose of the rendering step is to efficiently expand the input set of d-dimensional wavelet coefficients $W_S$ into a corresponding (approximate) d-dimensional array of counts $A_S$. In the preferred embodiment, an efficient algorithm (termed render) for rendering an input set of multi-dimensional wavelet coefficients is proposed. (Note that render can be seen either as a (final) query processing operator or as a post-processing step for the query.) The render algorithm exploits the fact that the number of coefficients in $W_S$ is typically much smaller than the number of array cells N. This implies that $A_S$ consists of large, contiguous multi-dimensional regions, where all the cells in each region contain exactly the same count. (In fact, because of the sparsity of the data, many of these regions will have counts of 0.) Furthermore, the total number of such "uniform-count" regions in $A_S$ is typically considerably smaller that N. Thus, the basic idea of the efficient rendering algorithm is to partition the multi-dimensional array $A_S$, one dimension at a time, into such uniform-count data regions and output the (single) count value corresponding to each such region (the same for all enclosed cells).

A preferred render algorithm (depicted in Table 3) recursively partitions the d-dimensional data array $A_S$, one dimension at a time and in the dimension order $D_1, \ldots, D_d$. Algorithm render takes two input arguments: (a) the index (i) of the next dimension $D_i$ along which the array $A_S$ is to be partitioned, and (b) the set of wavelet coefficients (COEFF) in the currently processed partition of $A_S$ (generated by the earlier partitioning along dimensions $D_1, \ldots, D_{i-1}$). The initial invocation of render is done with i=1 and COEFF=$W_S$.

the partitioning generates one-dimensional uniform-count ranges along $D_i$. Once the partitioning points along dimension $D_i$ have been determined, they are used to partition the hyper-rectangles of the wavelet coefficients in COEFF along $D_i$ (Steps 16–27). Algorithm render is then recursively invoked with the set of (partial) coefficients in each partition of $D_i$ to further partition the coefficients along the remaining dimensions $D_{i+1}, \ldots, D_d$. Once the array has been partitioned along all dimensions in D (i.e., render is invoked with parameter i>d), a coefficient W in the input set of coefficients COEFF is guaranteed to have a constant contribution to every cell in the corresponding d-dimensional partition. This essentially means that a d-dimensional uniform-count partition in $A_S$ has been discovered, and the partition boundaries and the corresponding tuple count (Steps 2–6) can be output.

Figure 6A:
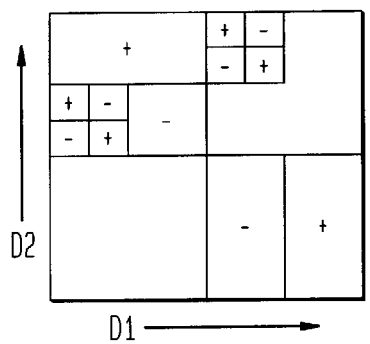
FIG. 6A is a block diagram representing a two-dimensional array.
Figure 6B:
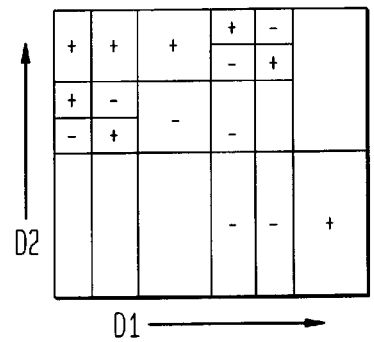
FIG. 6B is a block diagram representing the partitioning of the two-dimensional array in FIG. 6A by algorithm render in accordance with the present invention.

FIG. 6(b) depicts the partitioning of a two-dimensional data array generated by render for the input set consisting of the four wavelet coefficients shown in FIG. 6(a).

The time complexity of render can be shown to be $O(|W_S|*P)$, where P is the number of uniform-count partitions in $A_S$. (As observed, P is typically much smaller than N.) Further, render is extremely memory-efficient, requiring only $O(|W_S|*d)$ space.

TABLE 3 render: An efficient algorithm for rendering multi-dimensional wavelet coefficients.

```
procedure render(COEFF, i)
begin
1.   if (i > d) {
2.       count := 0
3.       for each coefficient W in COEFF
4.           sign := Π_{D_j∈D} sign_j
             /* sign_j := W.S.sign[j].lo if W.R.boundary[j].lo < W.S.signchange[j]; else, sign_j
                := W.S.sign[j].hi */
5.           count := count + sign * W.v
6.       output (W.R.boundary, count) /* W is any coefficient in COEFF */
7.       return
8.   }
9.   Q := ∅ /* elements e in priority queue Q are sorted in increasing order of e.key */
10.  for each coefficient W in COEFF
11.      insert element e into Q where e.key := W.R.boundary[i].lo − 1 and e.val := W
12.      insert element e into Q where e.key := W.R.boundary[i].hi − 1 and e.val := W
13.      if (W.R.boundary[i].lo < W.S.signchange[i] ≦ W.R.boundary[i].hi)
14.          insert element e into Q where e.key := W.S.signchange[i] − 1 and e.val := W
15.  Prev := ∞, TEMP 1 := ∅
16.  while (Q is not empty) do {
17.      TEMP2 := ∅, topkey := e.key for element e at head of Q
18.      dequeue all elements e with e.key = topkey at the head of Q and insert e.val into
         TEMP 1
19.      for each coefficient W in TEMP1
20.          delete W from TEMP1 if W.R.boundary[i].hi < prev + 1
21.      if W.R.boundary[i] overlaps with the interval [prev + 1, topkey] along dimension D_i
22.          W' := W
23.          W'.R.boundary[i].lo := prev + 1, W'.R.boundary[i].hi := topkey
24.          insert W' into TEMP2
25.      render(TEMP2, i + 1)
26.      prev := topkey
27.  }
end
```

When partitioning render $A_S$ into "uniform count" ranges along dimension $D_i$, the points that should be considered are those where the cell counts along $D_i$ could potentially change. These are the points where a new coefficient W starts contributing (W.R.boundary[i].lo), stops contributing (W.R.boundary[i].hi), or the sign of its contribution changes (W.S.signchange[i]). Algorithm render identifies these points along dimension $D_i$ for each coefficient in COEFF and stores them in sorted order in a priority queue Q (Steps 10–14). For any pair of consecutive partitioning points along $D_i$, the contribution of each coefficient in COEFF (and, therefore, their sum) is guaranteed to be constant for any row of cells along $D_i$ between the two points. Thus, abstractly,

IV. Experimental Results

An extensive empirical study was conducted using the query processing tools in accordance with a preferred embodiment of the present invention. The objective of the study was twofold. (1) to establish the effectiveness of the wavelet-based approach to approximate query processing, and (2) to demonstrate the benefits of the methodology compared to earlier approaches based on sampling and histograms. The experiments consider a wide range of queries executed on both synthetic and real-life data sets. The major findings of the study can be summarized as follows:

Improved Answer Quality: The quality/accuracy of the approximate answers obtained from the wavelet-based query processor is, in general, better than that obtained by either sampling or histograms for a wide range of data sets and select, project, join, and aggregate queries.

Low Synopsis Construction Costs: The single-pass wavelet decomposition algorithm is extremely fast and scales linearly with the size of the multi-dimensional array. (In contrast, histogram construction costs increase explosively with the dimensionality of the data.)

Fast Query Execution: Query execution-time speedups of more than two orders of magnitude are made possible by the approximate query processing algorithms. Furthermore, the query execution times are competitive with those obtained by histogram-based methods. Thus, the experimental results validate that wavelets are a viable, effective tool for general-purpose approximate query processing in DSS environments. All experiments reported in this section were performed on a Sun Ultra-2/200 machine with 512 MB of main memory, running Solaris 2.5.

Experimental Testbed and Methodoloyy

Approximate Query Answering Techniques: Three approximate query answering techniques were considered in the study.

Sampling: A random sample of the non-zero cells in the multi-dimensional array representation for each base relation is selected, and the counts for the cells are appropriately scaled. Thus, if the total count of all cells in the array is t and the sum of the counts of cells in the sample is s, then the count of every cell in the sample is multiplied by (t*v)/s. These scaled counts give the tuple counts for the corresponding approximate relation.

Histograms: Each base relation is approximated by a multi-dimensional MaxDiff(V,A) histogram. MaxDiff(V,A) histograms results in higher-quality approximate query answers compared to other histogram classes (e.g., EquiDepth or EquiWidth). Selects, joins, and aggregate operators on histograms are processed. Selects are applied directly to the histogram for a relation and a join between two relations is done by first partially expanding the histograms to generate the tuple-value distribution of each relation. An indexed nested-loop join is then performed on the resulting tuples.

Wavelets: Wavelet-coefficient synopses are constructed on the base relations (using algorithm COMPUTEWAVELET) and query processing is performed entirely in the wavelet-coefficient domain. In the join implementation, overlapping pairs of coefficients are determined using a simple nested-loop join. Furthermore, during the rendering step for non-aggregate queries, cells with negative counts are not included in the final answer to the query.

Since there are d dimensions in the multi-dimensional array for a d-attribute relation, c random samples require c*(d+1) units of space (d units to store the index of the cell and 1 unit to store the cell count.) Storing c wavelet coefficients also requires the same amount of space, since d units are needed to specify the position of the coefficient in the wavelet transform array and 1 unit is needed to specify the value for the coefficient. (Note that the hyper-rectangle and sign information for a base coefficient can easily be derived from its location in the wavelet transform array.) On the other hand, each histogram bucket requires 3*d+1 units of space, 2*d units to specify the low and high boundaries for the bucket along each of the d dimensions, d units to specify the number of distinct values along each dimension, and 1 unit to specify the average frequency for the bucket. Thus, for a given amount of space corresponding to c samples/wavelet coefficients, b≈c histogram buckets are stored to ensure a fair comparison between the methods.

Queries: The workload used to evaluate the various approximation techniques consists of four main query types: (1) SELECT Queries, ranges are specified for (a subset of) the attributes in a relation and all tuples that satisfy the conjunctive range predicate are returned as part of the query result, (2) SELECT-SUM Queries, the total sum of a particular attribute's values is computed for all tuples that satisfy a conjunctive range predicate over (a subset of) the attributes; (3) SELECT-JOIN Queries, after performing selections on two input relations, an equi-join on a single join dimension is performed and the resulting tuples are output; and, (4) SELECT-JOIN-SUM Queries, the total sum of an attribute's values is computed over all the tuples resulting from a SELECT-JOIN.

For each of the above query types, experiments were conducted with multiple different choices for (a) select ranges, and (b) select, join, and sum attributes. The results presented in the next section are indicative of the overall observed behavior of the schemes. Furthermore, the queries presented in this paper are fairly representative of typical queries over data sets.

Answer-Quality Metrics: In the experiments with aggregate queries (e.g., SELECT-SUM queries), the relative error in the aggregate value as a measure of the accuracy of the query answer is used. That is, if actual_aggr is the result of executing the aggregation query on the actual base relations, while approx_aggr is the result of running it on the corresponding synopses, then the accuracy of the approximate answer is given by $$\left| \frac{\text{actual\_aggr} - \text{approx\_aggr}}{\text{actual\_aggr}} \right|.$$

Deciding on an error metric for non-aggregate queries is slightly more involved. The problem is that non-aggregate queries do not return a single value, but rather a set of tuples (with associated counts). Capturing the "distance" between such an answer and the actual query result requires that how these two (multi)sets of tuples differ in both (a) the tuple frequencies, and (b) the actual values in the tuples be taken into account. (Thus, simplistic solutions like "symmetric difference" are insufficient.) A variant of the Earth Mover's Distance (EMD) error metric was chosen, since it offers computational efficiency and natural handling of non-integral counts. A discussion of EMD can be found in "A Metric for Distributing with Applications to Image Databases," by Y. Rubner, C. Tomasi, and L. Guibas, in "Proceedings of the 1998 IEEE International Conference on Computer Vision, Bombay, India, 1998," incorporated herein by reference.

The EMD error metric is proposed for computing the dissimilarity between two distributions of points and applied to computing distances between images in a database. The idea is to formulate the distance between two (multi)sets as a bipartite network flow problem, where the objective function incorporates the distance in the values of matched elements and the flow captures the distribution of element counts.

Results

Synthetic Data Sets and Queries: A synthetic data generator populates regions of cells in the multi-dimensional array. The input parameters to the generator along with their description and default values are as illustrated in Table 4. The generator assigns non-zero counts to cells in r rectangular regions each of whose volume is randomly chosen between $v_{min}$ and $v_{max}$ (the volume of a region is the number of cells contained in it). The regions themselves are uniformly distributed in the multi-dimensional array. The sum of the counts for all the cells in the array is specified by the parameter t. Portion $t*(1-n_c)$ of the count is partitioned across the r regions using a Zipfian distribution with value 2. Within each region, each cell is assigned a count using a Zipfian distribution with values between $z_{min}$ and $z_{max}$, and based on $L_1$ distance of the cell from the center of the region. Thus, the closer a cell is to the center of its region, the larger its count value. Finally, noise is introduced into the data set by randomly choosing cells such that the noise cells constitute a fraction $n_v$ of the total number of non-zero cells. The noise count $t*n_c$ is then uniformly distributed across the noise cells.

TABLE 4

Input Parameters to Synthetic Data Generator

| Parameter | Description | Default Value |
| --- | --- | --- |
| d | Number of dimensions | 2 |
| s | Size of each dimension (equal for all dimensions) | 1024 |
| r | Number of regions | 10 |
| vmin, vmax | Minimum and maximum volume of each region | 2500, 2500 |
| z | Skew across regions | 0.5 |
| zmin, zmax | Minimum and maximum skew within each region | 1.0, 1.0 |
| nv, nc | Noise volume and noise count | 0.05, 0.05 |
| t | Total count | 1000000 |
| c | Number of coefficients/samples retained | 1250 |
| b | Number of histogram buckets | 420 |
| sel | Selectivity in terms of volume | 4% |

Note that with the default parameter settings described in Table 4, there are a total of a million cells of which about 25000 have non-zero counts. Thus, the density of the multi-dimensional array is approximately 2.5%. Further, in the default case, the approximate representations of the relations occupy only 5% of the space occupied by the original relation—this is because 1250 samples/coefficients are retained out of 25000 non zero cells which translates to a compression ratio of 20. The same is true for histograms. Finally, the default selectivity of range queries on the multi-dimensional array is set to 4%—the SELECT query range along each dimension was set to (512,720).

Time to Compute the Wavelet Transform: In order to demonstrate the effectiveness of the single pass algorithm for computing the wavelet transform of a multi-dimensional array, in Table 5, the running times of the algorithm are presented as the number of cells in the multi-dimensional array is increased from 250,000 to 16 million. The density of the multi-dimensional array is kept constant at 2.5% by appropriately scaling the number of cells with non-zero counts in the array. From the table, it follows that the wavelet computation time scales linearly with the total number of cells in the array.

TABLE 5

Wavelet Transform Computation Times

| Number of Cells in Multi-dimensional Array | 250,000 | 1000,000 | 4000,000 | 16,000,000 |
| --- | --- | --- | --- | --- |
| Execution Time (in seconds) | 6.3 | 26.3 | 109.9 | 445.4 |

SELECT Queries: In the first set of experiments, a sensitivity analysis of the EMD error for SELECT queries to parameters like storage space, skew in cell counts within a region, cell density, and query selectivity is carried out. In each experiment, the parameter of interest was varied while the remaining parameters were fixed at their default values.

The results indicate that for a broad range of parameter settings, wavelets outperform both sampling and histograms—in some cases, by more than an order of magnitude.

SELECT Queries: Effect of Cell Density and Query Selectivity

Figure 7A:
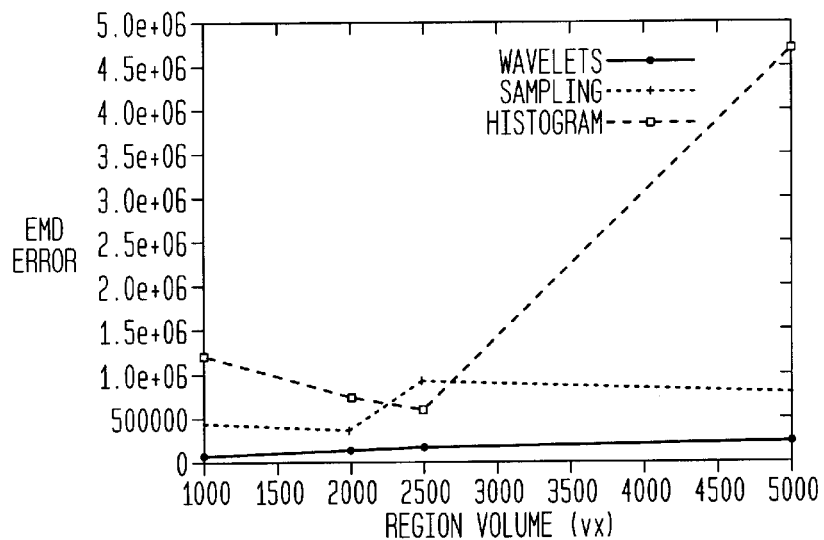
FIG. 7A is a graph of the select queries error sensitivity to cell density in accordance with the present invention.

Cell Density: FIG. 7(a) depicts graphs for EMD error as $v_{max}$, the maximum volume of regions is varied between 1000 (1% density) and 5000 (5% density) ($v_{min}$ is fixed at 1000). As the number of non-zero cells in the multi-dimensional array increases, the number of coefficients, samples and histogram buckets needed to approximate the underlying data also increases. As a consequence, in general, the EMD error is more when regions have larger volumes. Note the sudden jump in the EMD error for histograms when the volume becomes 5000. This is because the histogram buckets overestimate the total of the cell counts in the query region by almost 50%. In contrast, the error in the sum of the cell counts within the query range with wavelets is less than 0.1%.

Figure 7B:
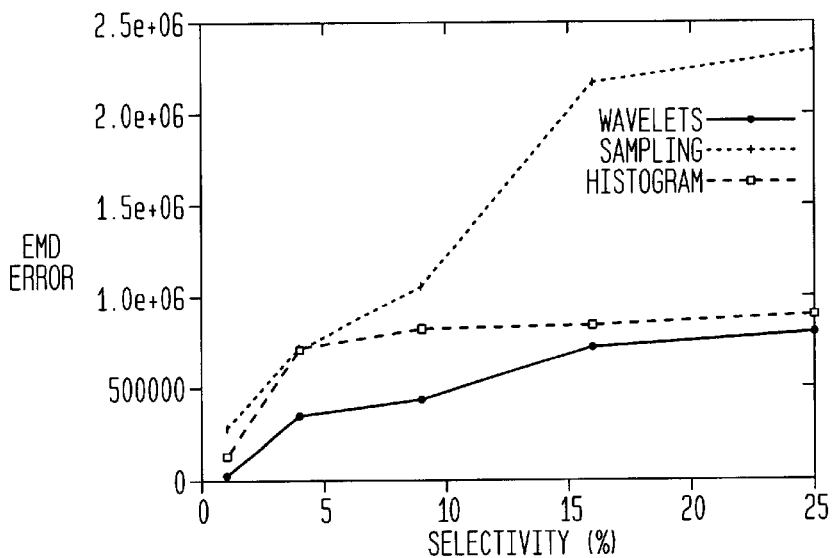
FIG. 7B is a graph of the select queries error sensitivity to queries selectivity in accordance with the present invention.

Selectivity of Query: FIG. 7(b) illustrates the EMD errors for the three techniques as the selectivity of range queries is increased from 2% to 25%. Since the number of tuples in both the accurate as well as the approximate answer increase, the EMD error increases as the selectivity of the query is increased (the EMD error is the sum of the pairwise distances between elements in the two sets of answers weighted by the flows between them).

Figure 8A:
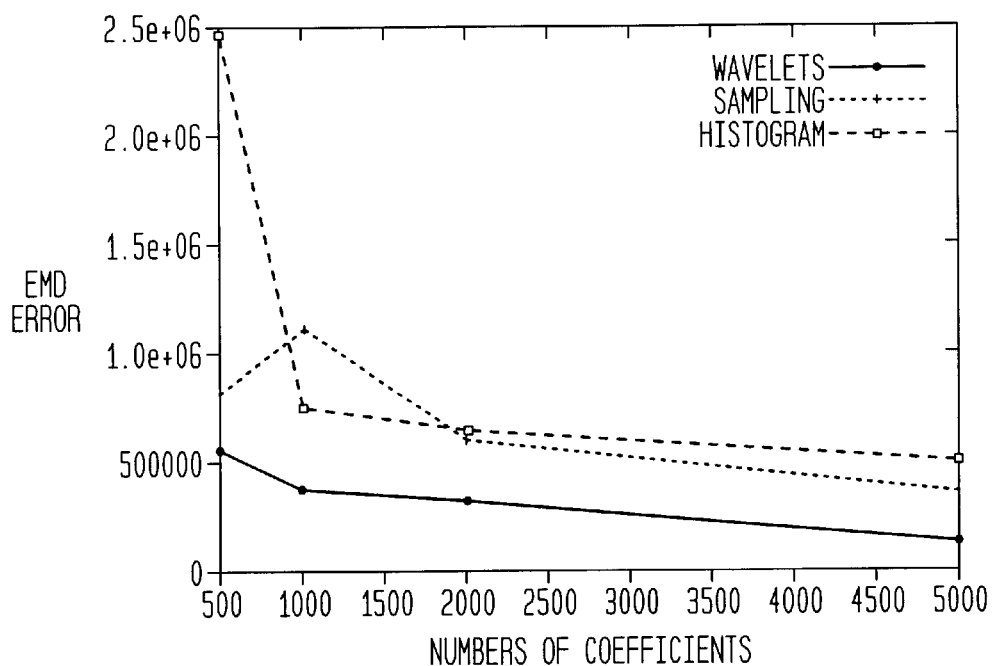
FIG. 8A is a graph of select queries error sensitivity to allocated space in accordance with the present invention.

Storage Space: FIG. 8(a) depicts the behavior of the EMD error for the three approximation methods as the space allocated to each is increased from 2% to 20% of the relation. For a given value of the number of wavelet coefficients c along the x axis, histograms are allocated space for approximately c/3 buckets. As expected, the EMD error for all the cases reduces as the amount of space is increased. Note that for 500 coefficients, the EMD error for histograms is almost five times worse that the corresponding error for wavelets. This is because the few histogram buckets are unable to accurately capture the skew within each region (in the default setting, the zipf parameter for the skew within a region is 1).

Figure 8B:
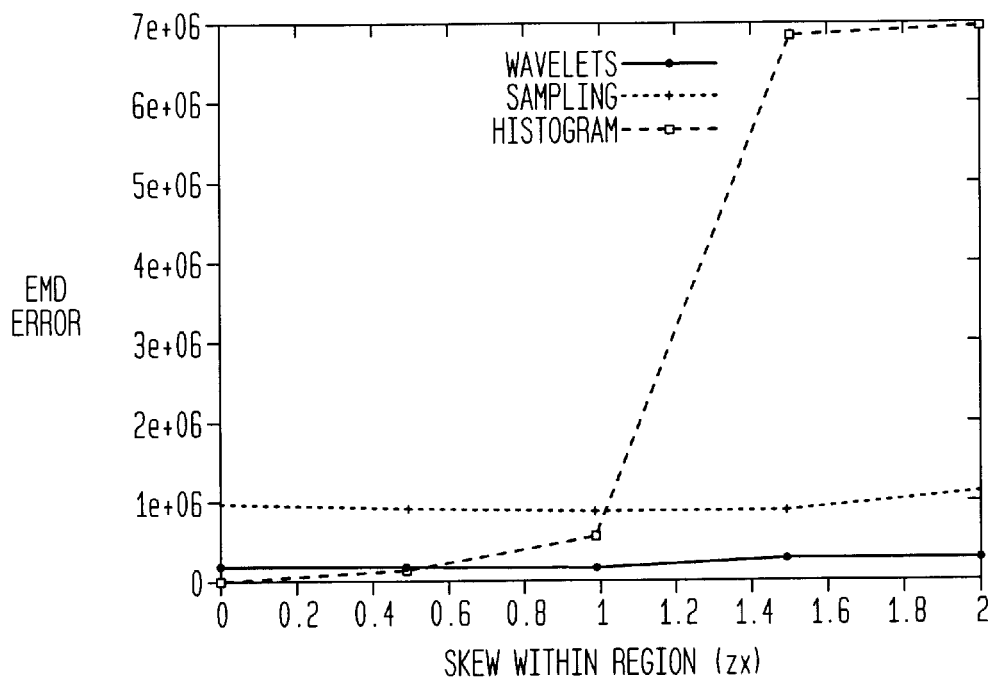
FIG. 8B is a graph representing select queries error sensitivity to skewing within the regions in accordance with the present invention.

Skew Within Region: FIG. 8(b) depicts a plot of the EMD error as $z_{max}$, the zipf parameter that controls the maximum skew within each region is increased from 0 to 2.0 ($z_{min}$ is fixed at 0). Histograms perform the best for values of z max between 0 and 0.5 when the cell counts within each region are more or less uniformly distributed. However, once the maximum skew increases beyond 0.5, the histogram buckets cannot capture the data distribution in each region accurately. Consequently, there is a spike in the EMD error for a skew corresponding to a zipf value of 1.5.

Figure 9A:
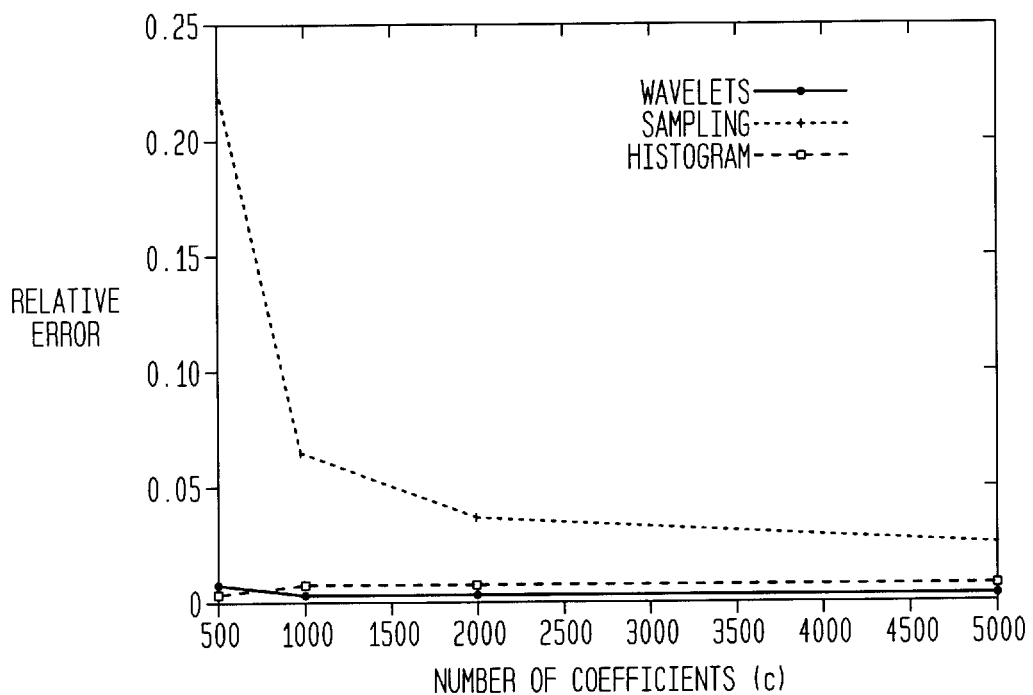
FIG. 9A is a graph of the effects of allocated space for select-sum queries in accordance with the present invention.

SELECT-SUM Queries: FIG. 9(a) depicts the performance of the various techniques for SELECT-SUM queries as the allocated space is increased from 2% to 20% of the relation. Both wavelets and histograms exhibit excellent performance compared to random sampling, the relative errors are extremely low for both techniques—0.2% and 0.6%, respectively. This is quite different from the EMD error curves for the three schemes (see FIG. 8(a)). Therefore, although histograms and wavelets are excellent at approximating aggregate frequencies, they are not as good at capturing the distribution of values accurately. SELECT-JOIN and SELECT-JOIN-SUM Queries For join queries, in FIG. 9(b), do not show the errors for sampling since in almost all cases, the final result contained zero tuples. Also, only the relative error results for SELECT-JOIN-SUM queries are plotted, since the EMD error graphs for SELECT-JOIN queries were similar.

When the number of coefficients retained is 500, the relative error with wavelets is more than four times better than the error for histograms—this is because the few histogram buckets are not as accurate as wavelets in approximating the underlying data distribution. For histograms, the relative error decreases for 1000 and 2000 coefficients, but show an abrupt increase when the number of coefficients is 5000. This is because at 5000 coefficients a large bucket appeared in the query region (that was previously absent) to capture the underlying noise in the data set. Cells in this bucket contributed to the dramatic increase in the join result size, and subsequently, the relative error.

Figure 9B:
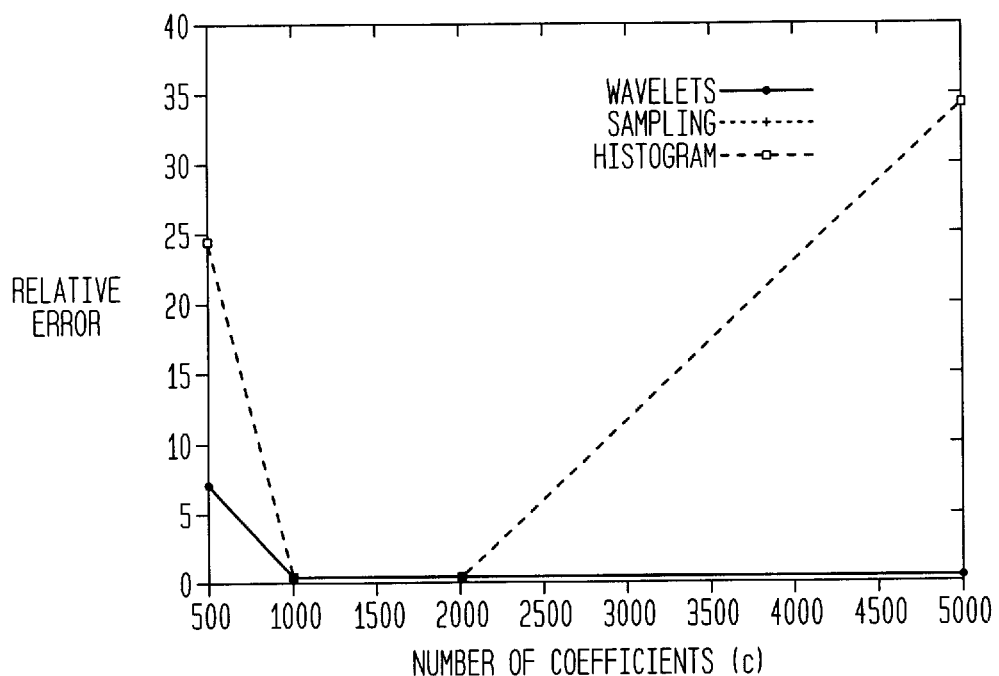
FIG. 9B is a graph of the effects of allocated space in select-join-sum queries in accordance with the present invention.

It should be pointed out that although the performance of histograms is erratic for the query region in FIG. 9(b), histogram errors are found to be more stable on other query regions. Even for such regions, however, the errors observed for histograms were, in most cases, more than an order of magnitude worse than those for wavelets. Note that the relative error for wavelets is extremely low (less than 1%) even when the coefficients take up space that is about 4% of the relation.

Query Execution Times: In order to compare the query processing times for the various approaches, the time (in seconds) for executing a SELECT-JOIN-SUM query using each approach was measured. The time for random sampling were not considered since the join results with samples did not generate any tuples, except for large sample sizes. The running time of the join query on the original base relations (using an indexed nested-loop join) to produce an exact answer was 3.6 seconds. In practice, it is expected that this time will be much higher since the entire relations fit in main memory. As is evident from FIG. 10(a), the wavelet-based technique is more than two orders of magnitude faster than running the queries on the entire base relations. Also, note that the performance of histograms is much worse than wavelets—the reason for this is that when performing joins, the histograms are first partially expanded to generate the approximate relations and, subsequently, the relations are joined. The problem is that the intermediate relations can become fairly large and may even contain more tuples than the original relations. For example, with 500 coefficients, the expanded histogram contains almost 5 times as many tuples as the base relations. The sizes of the approximate relations decrease as the numbers of buckets increase, and thus execution times for histograms fall for larger number of buckets. In contrast, in the wavelet approach, join processing is carried out exclusively in the compressed domain, that is, joins are performed directly on the wavelet coefficients without ever materializing intermediate relations. The tuples in the final query answer are generated at the very end as part of the rendering step and this is the primary reason for the superior performance of the wavelet approach.

Real-life Data Sets: Real-life data sets were obtained from the US Census Bureau. The Current Population Survey (CPS) data source, containing the Person Data Files of the March Questionnaire Supplement, was employed. In addition, the 1992 data file for the select and select sum queries, and the 1992 and 1994 data files for the join and join sum queries were used. For both files, the data was projected on the following 4 attributes whose domain values were previously coded: age (with value domain 0 to 17), educational attainment (with value domain 0 to 46), income (with value domain 0 to 41) and hours per week (with value domain 0 to 13). Along with each tuple in the projection, a count was stored which represents the number of times it appears in the file. The maximum domain values were rounded off to the nearest power of 2 resulting in domain sizes of 32, 64, 64 and 16 for the 4 dimensions, and a total of 2 million cells in the array. The 1992 and the 1994 collections had 16271 and 16024 cells with non-zero counts, respectively, resulting in a density of approximately 0.001. However, even though the density is very low, large dense regions within the arrays were observed—these dense regions spanned the entire domains of the age and income dimensions.

Figures 10A, 10B:
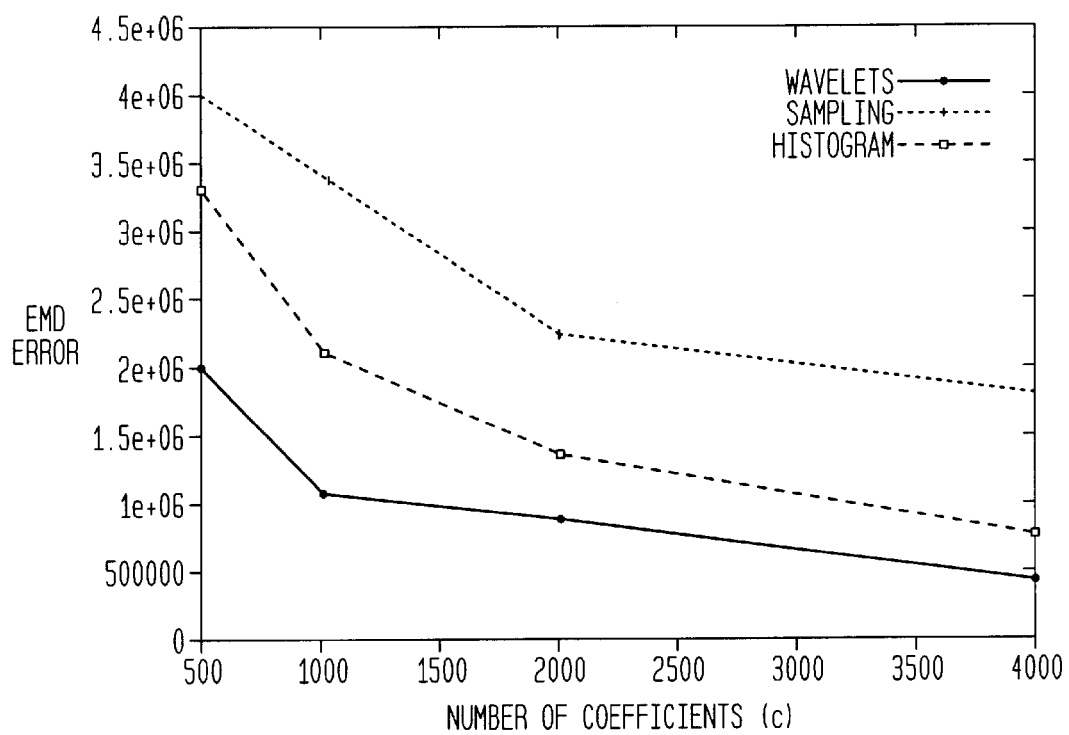
FIG. 10A is a chart of select-join-sum query execution times in accordance with the present invention.
FIG. 10B is a graph of select query errors on real life data in accordance with the present invention.
Figure 11A:
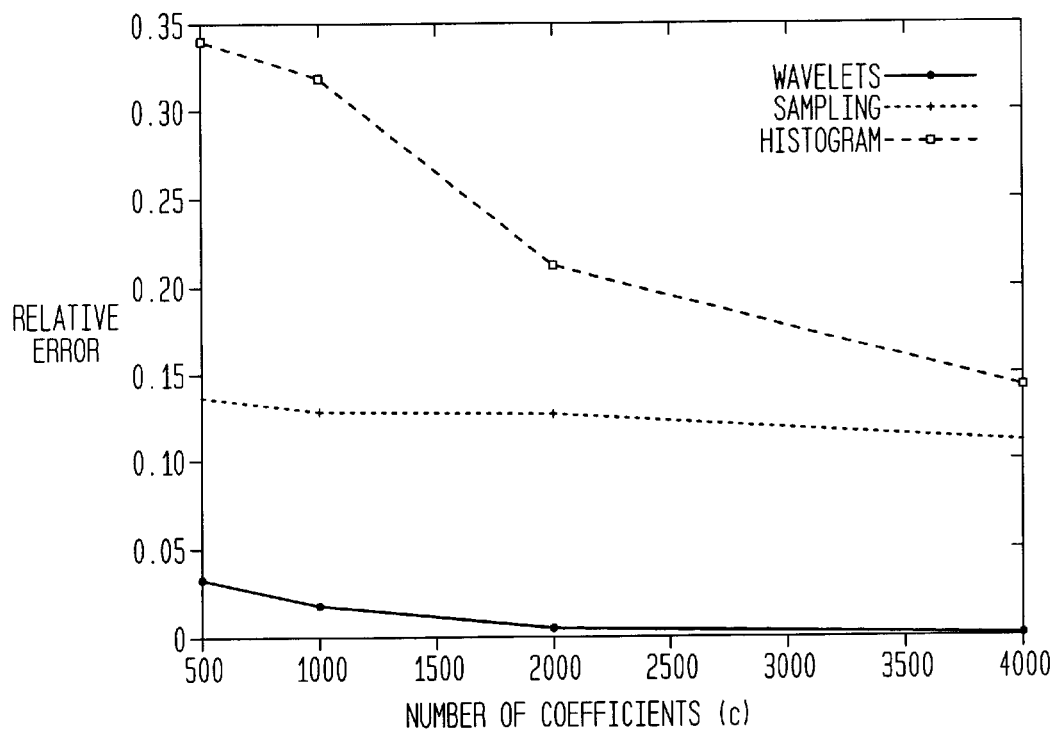
FIG. 11A is a graph of errors for select-sum queries on real life data.
Figure 11B:
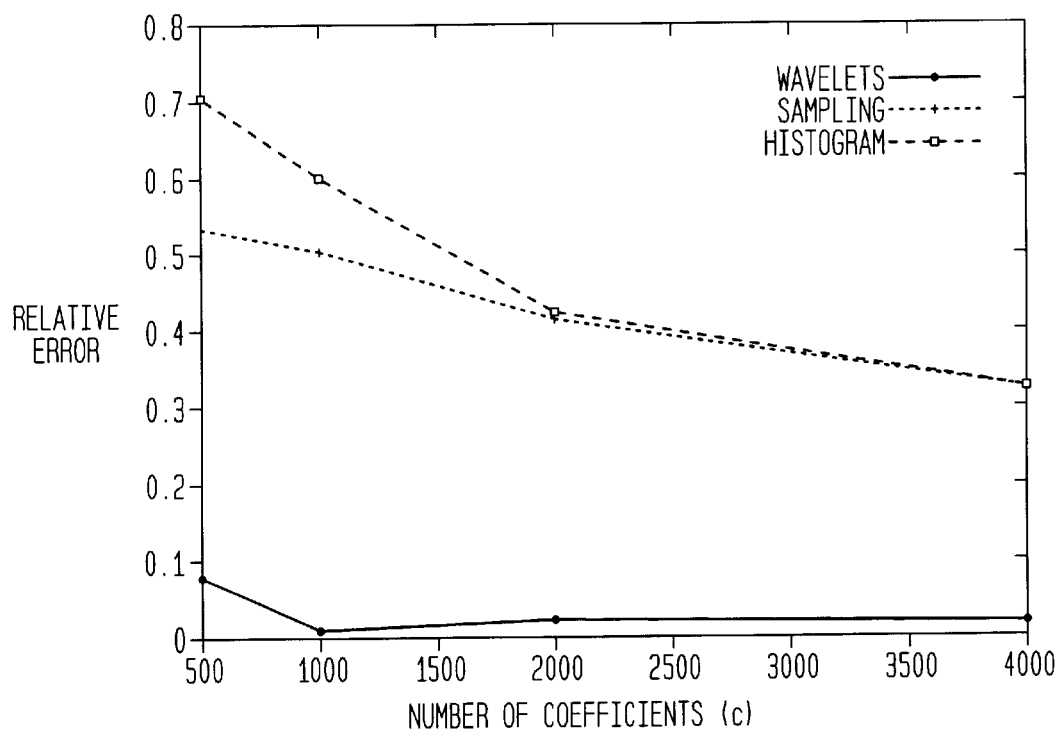
FIG. 11B is a graph of errors for select-join-sum queries on real life data in accordance with the present invention.

For all the queries, the following select range was used: $5 \leq age < 10$ and $10 \leq income < 15$ that was found to be representative of several considered select ranges (the remaining 2 dimensions were left unspecified). The selectivity of the query was 1056/16271=6%. For the sum queries, the sum operation was performed on the age dimension. For the join query, the join was performed on the age dimension between the 1992 and 1994 data files. SELECT Queries: FIGS. 10(b) and 11(a) depict a plot of the EMD error and relative error for SELECT and SELECT-SUM queries, respectively, as the space allocated for the approximations is increased from 3% to 25% of the relation. From the graphs, it follows that wavelets result in the least value for the EMD error, while sampling has the highest EMD error. For select sum queries, wavelets exhibit more than an order of magnitude improvement in relative error compared to both histograms and sampling (the relative error for wavelets is between 0.5% and 3%). Thus, the results for the select queries indicate that wavelets are effective at accurately capturing both the value as well as the frequency distribution of the underlying real-life data set. JOIN Queries: FIG. 11(b) only depicts the results of the SELECT-JOIN-SUM queries, since the EMD error graphs for SELECT-JOIN queries were similar. Over the entire range of coefficients, wavelets outperform sampling and histograms, in most cases by more than an order of magnitude. With the real-life data set, even after the join, the relative aggregate error using wavelets is very low and ranges between 1% to 6%. The relative error of all the techniques improve as the amount of allocated space is increased. Note that compared to the synthetic data sets, where the result of a join with sampling contained zero tuples in most cases, for the real-life data sets, sampling performs quite well. This is because the size of the domain of the age attribute on which the join is performed is only 18, which is quite small. Consequently, the join query result using samples is no longer empty.

V. Conclusion

Approximate query processing is emerging as an essential tool for numerous data-intensive applications requiring interactive response times. Most work in this area, however, has been of a limited scope, and conventional approaches based on sampling or histograms appear to be inherently limited when it comes to complex approximate queries over high-dimensional data sets. We have proposed the use of multi-dimensional wavelets as an effective tool for general-purpose approximate query processing in modern, high-dimensional applications. The approach of the present invention is based on building wavelet-coefficient synopses of the data and using these synopses to provide approximate answers to queries. We have demonstrated the construction efficiency of this technique by proposing a novel wavelet decomposition algorithm that under some scenarios computes these synopses in a single pass over the data having minimal memory requirements. We have also developed novel query processing algorithms that operate directly on the wavelet-coefficient synopses of relational data, allowing processing of arbitrarily complex queries entirely in the wavelet-coefficient domain. This ensures extremely fast response times since the approximate query execution engine of the present invention can do the bulk of its processing over compact sets of wavelet coefficients, essentially postponing the expansion into relational tuples until the end-result of the query. Finally, we have conducted an extensive experimental study with synthetic as well as real-life data sets to determine the effectiveness of the wavelet-based approach compared to sampling and histograms. Our results demonstrate that the wavelet-based query processor (a) provides approximate answers of better quality than either sampling or histograms, and (b) offers query execution-time speedups of more than two orders of magnitude and is significantly faster than histogram-based methods for join queries. Furthermore, our single-pass wavelet decomposition algorithm is shown to be extremely fast and scale linearly with the size of the multi-dimensional array.

Having thus described a few particular embodiments of the invention, various alterations, modifications, and improvements will readily occur to those skilled in the art. For example, the invention may be embodied in software, hardware, or other means for storing instructions executed by a processor. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A computer implemented method for querying electronic data to generate approximate answers to queries comprising the steps of:
    generating multi-dimensional wavelet-coefficient synopses of at least one relational array;
    querying said multi-dimensional wavelet-coefficient synopses of said at least one relational array to obtain a wavelet-coefficient result; and
    deriving an approximate result from said wavelet-coefficient result.

2. The method of claim 1, wherein said generating step comprises:
    decomposing said at least one relational array into multi-dimensional wavelet-coefficients; and
    retaining a portion of said multi-dimensional wavelet-coefficients which exceed a predefined threshold to produce said multi-dimensional wavelet-coefficient synopses.

3. The method of claim 2, wherein said decomposing step comprises:
    decomposing said at least one relational array into multi-dimensional Haar wavelet-coefficients.

4. The method of claim 3, wherein said decomposing step is performed in a single pass over said at least one relational array.

5. The method of claim 1, wherein said wavelet-coefficient synopses are multi-dimensional Haar wavelet-coefficient synopses.

6. The method of claim 5, wherein said generating step comprises:
    decomposing said at least one relational array into a plurality of sub-arrays;
    recursively computing multi-dimensional Haar wavelet-coefficients for each of said plurality of sub-arrays; and
    composing the recursively computed multi-dimensional Haar wavelet-coefficients for said plurality of sub-arrays into said multi-dimensional Haar wavelet-coefficient synopses.

7. The method of claim 1, wherein said querying step is performed directly on said wavelet-coefficient synopses of said at least one relational array.

8. The method of claim 7, wherein said querying step comprises using query processing algorithms that operate directly on said wavelet coefficient synopses.

9. The method of claim 8, wherein the input and output of each of said query processing algorithms are sets of wavelet coefficients.

10. The method of claim 1, wherein said deriving step comprises rendering said approximate result from said wavelet-coefficient result.

11. The method of claim 10, wherein said approximate result is in relational form.

12. The method of claim 1, wherein said querying step comprises at least the step of performing aggregate and non-aggregate SQL operations directly on said wavelet-coefficient synopses of said at least one relational array in the wavelet coefficient domain.

13. A computer implemented query method for querying electronic data comprising the steps of:
    generating multi-dimensional wavelet-coefficient synopses of relational data;
    querying said multi-dimensional wavelet-coefficient synopses to obtain a wavelet-coefficient result; and
    expanding said wavelet-coefficient result into an approximate relational result.

14. The method of claim 13, wherein said generating step comprises computing said wavelet-coefficient synopses in a single pass over said relational data.

15. The method of claim 14, wherein said wavelet-coefficient synopses are multi-dimensional Haar wavelet-coefficient synopses.

16. The method of claim 13, wherein said querying step comprises at least the step of performing aggregate and non-aggregate SQL operations directly on said wavelet-coefficient synopses of said at least one relational array in the wavelet coefficient domain.

17. A device for querying electronic data to generate approximate answers to queries comprising:
    a processing unit having:
        a first program for generating multi-dimensional wavelet-coefficient synopses of at least one relational array;
        a second program for querying said wavelet-coefficient synopses of said at least one relational array to obtain a wavelet-coefficient result; and
        a third program for deriving an approximate result from said wavelet-coefficient result; and
    a processor for executing the programs; and
    an output device for displaying said approximate result.

18. The system of claim 17, wherein said second program performs aggregate and non-aggregate SQL operations directly on said wavelet-coefficient synopses of said at least one relational array in the wavelet coefficient domain.

* * * * *